United States Patent
Wong

(10) Patent No.: US 11,448,193 B2
(45) Date of Patent: Sep. 20, 2022

(54) SELF-ALIGNING TO WIND FACING FLOATING PLATFORM SUPPORTING MULTI-WIND TURBINES AND SOLAR FOR WIND AND SOLAR POWER GENERATION AND THE CONSTRUCTION METHOD THEREON

(71) Applicants: Carlos Wong, Macau (MO); ZHUHAI KALUOSI (MACAU) ENGINEERING CONSULTANT LTD., Macau (MO)

(72) Inventor: Carlos Wong, Macau (MO)

(*) Notice: Subject to any disclaimer, the term of this patent is extended or adjusted under 35 U.S.C. 154(b) by 0 days.

(21) Appl. No.: 16/882,514

(22) Filed: May 24, 2020

(65) Prior Publication Data
US 2020/0392946 A1 Dec. 17, 2020

Related U.S. Application Data

(63) Continuation of application No. PCT/IB2018/059317, filed on Nov. 26, 2018.

(51) Int. Cl.
*B63B 35/44* (2006.01)
*F03D 13/25* (2016.01)
*B63B 21/50* (2006.01)

(52) U.S. Cl.
CPC ............ *F03D 13/25* (2016.05); *B63B 35/44* (2013.01); *B63B 21/50* (2013.01);
(Continued)

(58) Field of Classification Search
CPC .......... F03D 13/25; F03D 1/02; F03D 7/0204; B63B 35/44; B63B 21/50;
(Continued)

(56) References Cited

U.S. PATENT DOCUMENTS

| 8,823,198 B2 | 9/2014 | De Boer | |
|---|---|---|---|
| 2011/0037264 A1* | 2/2011 | Roddier | F03D 9/25 290/44 |
| 2017/0218919 A1 | 8/2017 | Wong | |

FOREIGN PATENT DOCUMENTS

WO WO-2016004739 A1 * 1/2016 ............... F03D 9/25

OTHER PUBLICATIONS

English translation of SIPO, PRC first office action.
International search report of PCT/IB2018/059317, dated Feb. 22, 2019.

* cited by examiner

*Primary Examiner* — Tulsidas C Patel
*Assistant Examiner* — Joseph Ortega
(74) *Attorney, Agent, or Firm* — Charter IP LLC; Matthew J Lattig

(57) ABSTRACT

A self-aligning to the incoming wind floating platform supporting multiple wind turbines (17, 18) forms a wind power generation unit. Under horizontal wind, the wind load resultant passes the center of geometry (or "C.Geo") of the wind load receiving areas of the floating platform, but not the turning axis (15). This results in a yaw moment about the turning axis (15) to turn the floating platform, until the wind load resultant simultaneously passes through the C.Geo and the turning axis (15). A wind park or wind farm may include at least one of these floating platforms that are capable of self-aligning to the incoming wind for electric power generation. The floating platform helps reduce the length of a submarine power cable (44) of the platform, hence reducing electric resistance and subsequently heat loss, thereby reducing the cost of the submarine power cable (44).

15 Claims, 12 Drawing Sheets

(52) U.S. Cl.
CPC ..... *B63B 2035/446* (2013.01); *F05B 2240/93* (2013.01); *F05B 2240/95* (2013.01)

(58) Field of Classification Search
CPC .......... B63B 2035/446; B63B 35/4406; B63B 75/00; F05B 2240/93; F05B 2240/95; Y02E 10/727; Y02E 10/72
See application file for complete search history.

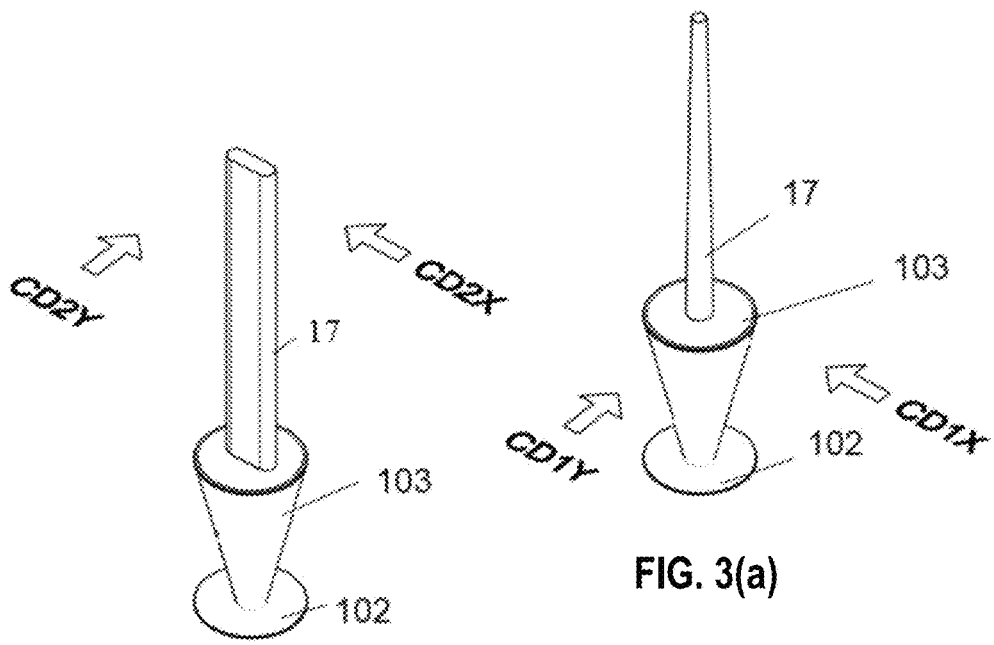
FIG. 3(a)
FIG. 3(b)
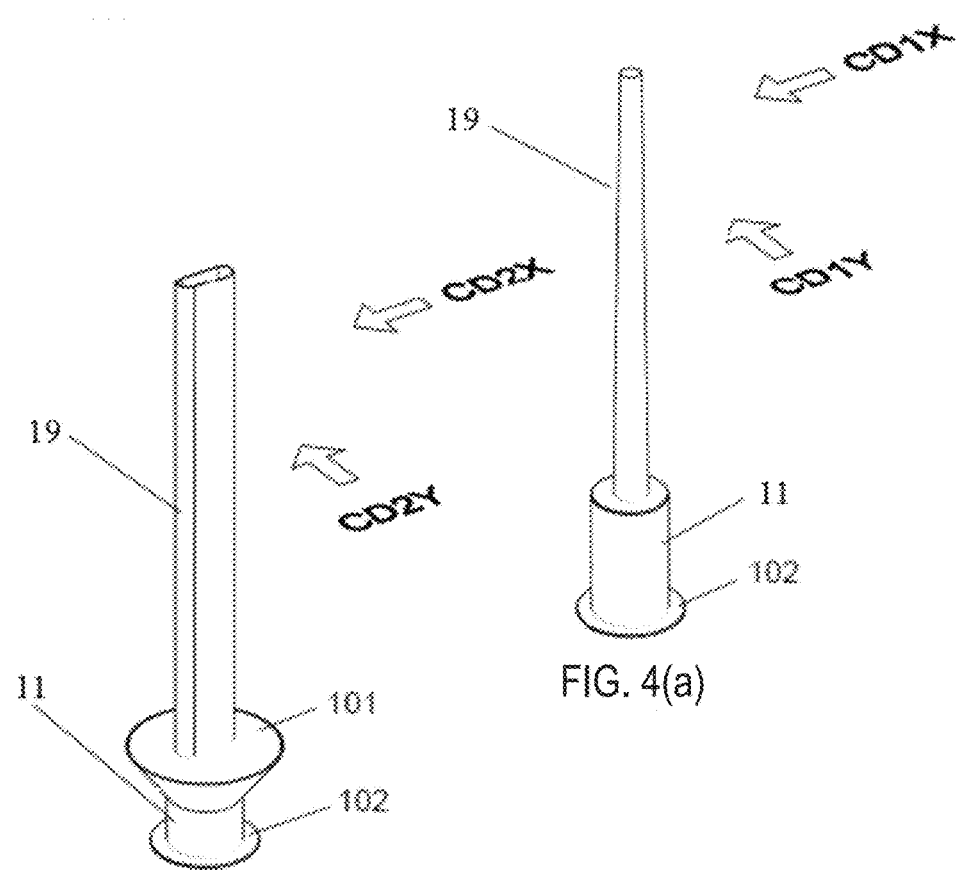
FIG. 4(a)
FIG. 4(b)

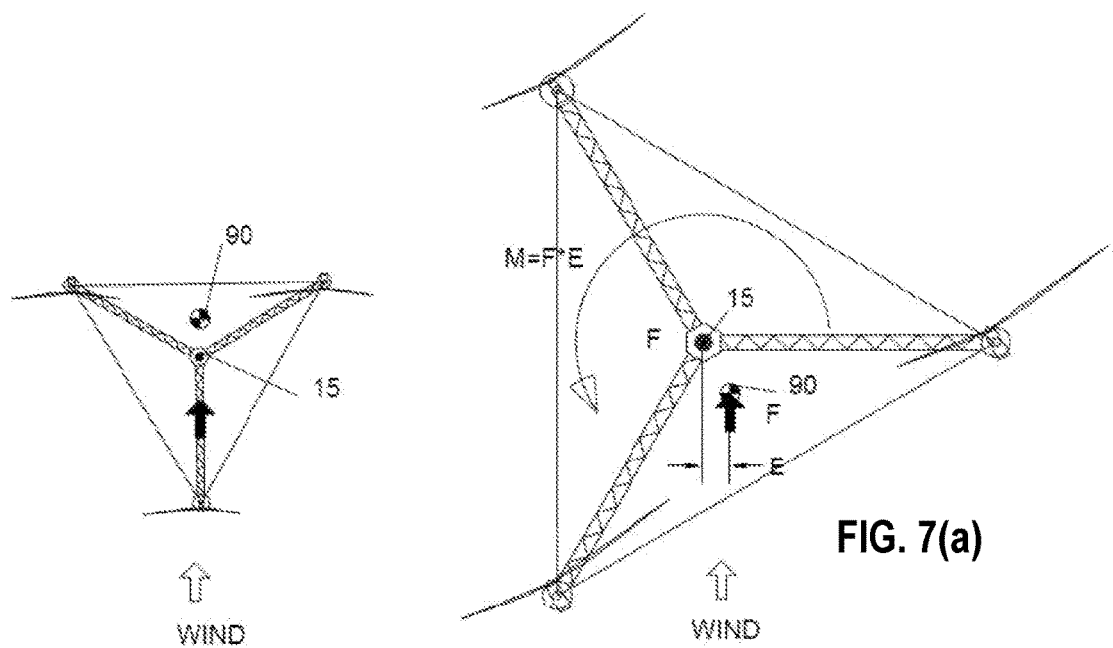
FIG. 7(a)
FIG. 7(b)
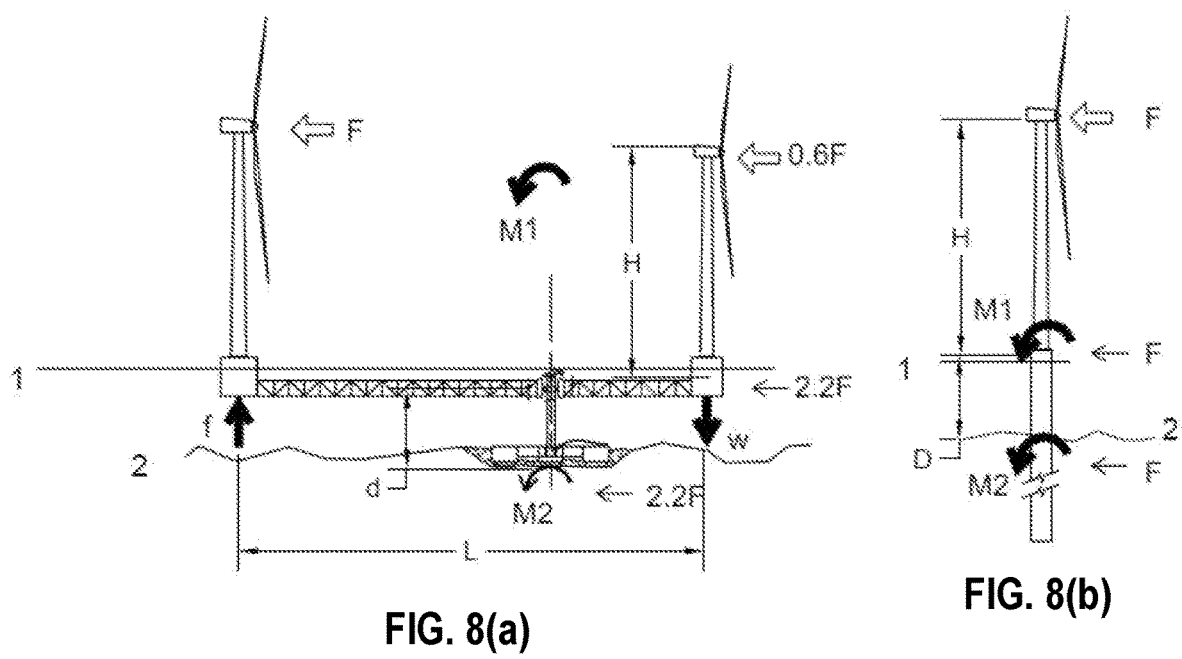
FIG. 8(a)
FIG. 8(b)

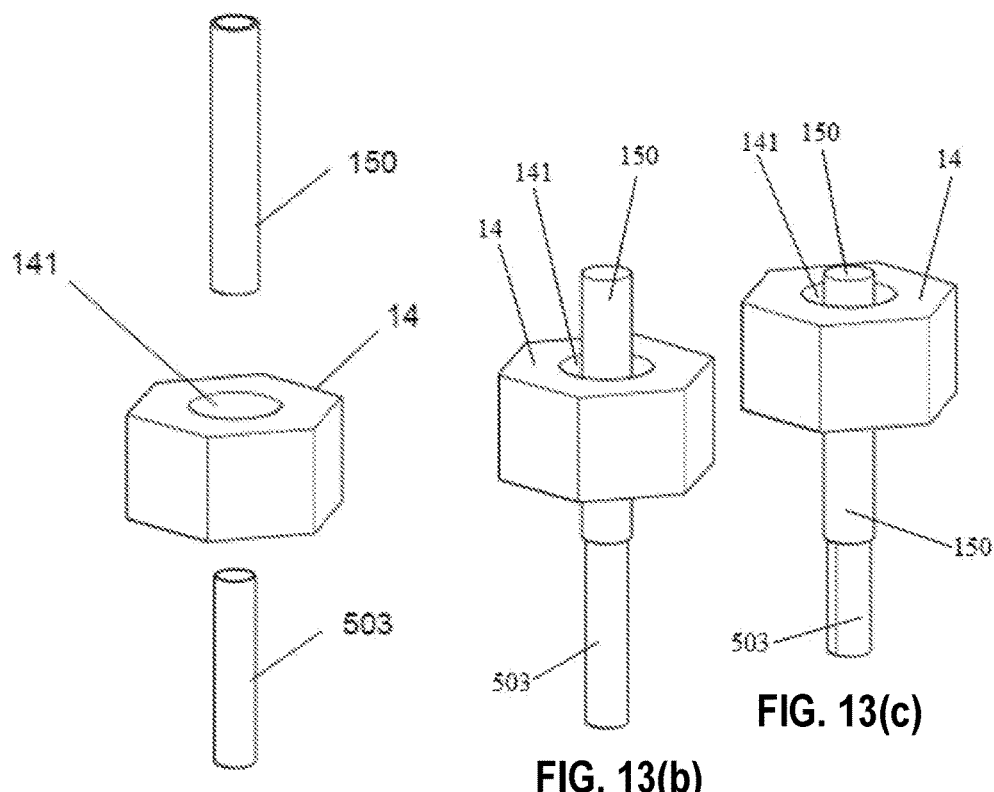
FIG. 13(a)
FIG. 13(b)
FIG. 13(c)
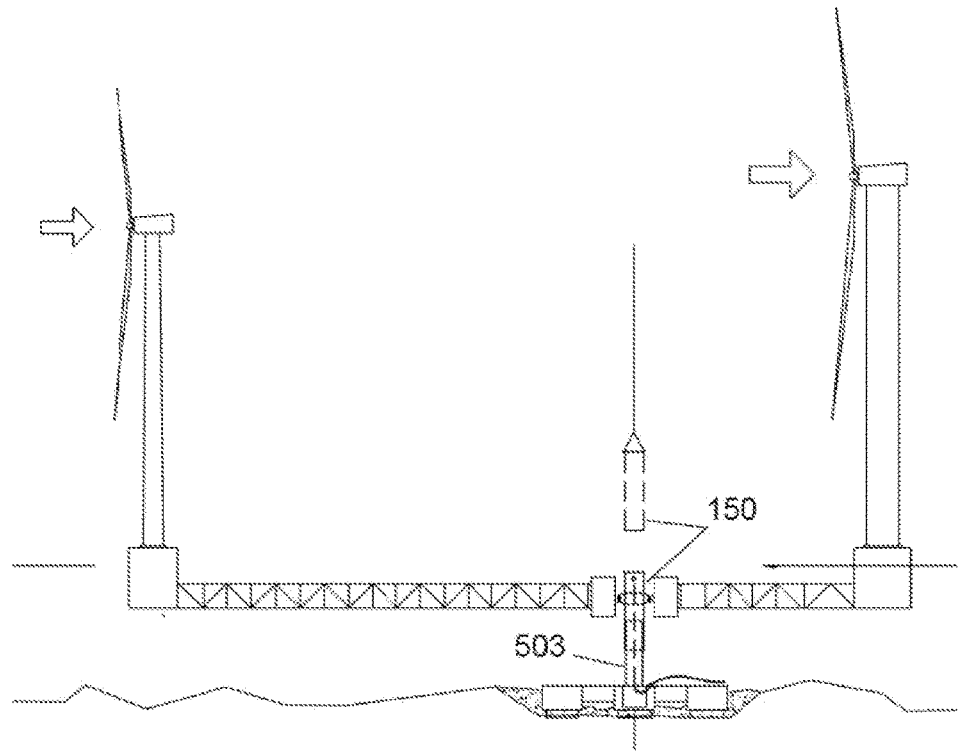
FIG. 14

SELF-ALIGNING TO WIND FACING FLOATING PLATFORM SUPPORTING MULTI-WIND TURBINES AND SOLAR FOR WIND AND SOLAR POWER GENERATION AND THE CONSTRUCTION METHOD THEREON

CROSS-REFERENCE TO RELATED APPLICATIONS

The present application claims the benefit under 35 U.S.C. § 363, § 365(c) and § 120 of PCT International Application Serial No. PCT/IB2018/059317 to co-applicants ZHUHAI KALOUSI (MACAU) ENGINEERING CONSULTANT LTD. and Carlos WONG, filed Nov. 26, 2018, pending, which in turn claims priority to pending Chinese Pat. Appl. Ser. No. 201711187761.2, filed Nov. 24, 2017. The entire contents of each application is hereby incorporated by reference herein.

BACKGROUND

1. Field

Example embodiments in general relate to a self-aligning to wind floating platform supporting multiple wind turbines for wind power generation deposited in a body of water to generate electricity, its application in offshore wind farm power installation, and the fabrication and construction method thereon.

2. Related Art

The world's metropolitan cities are all close to the shore and their electricity consumption are huge. Offshore wind power is the most suitable green power for coastal cities, as it is the most effective in terms of conversion and scale. However, offshore wind power development has been lacking behind land-based wind power development. This is due primarily to the high construction costs of the turbine bottom which is fixed to a foundation in sea.

Offshore wind turbines are classified into two types according to their founding methods: (1) bottom fixed type, and (2) floating type. The bottom fixed type wind turbine is only effective in the shallow near shore waters due to the construction difficulty in deep water. An offshore wind turbine is typically supported on a single large steel pile having a diameter between about 6-8 meters. Large scale special piling vessels are required for sinking the large diameter steel piles; as such, these vessels are quite expensive and usually are controlled by only a few companies.

As suitable near-shore wind farm sites are being used up, far-shore wind farm sites need to be explored. In this situation, the bottom fixed-type wind turbine is uneconomical, however, the floating type is a more attractive alternative. Almost all the floating types developed to date are of single turbine.

To support a structure of several hundred tons (including power generator, gear box, yaw mechanism and the rotor blades integral located at a height of 100 m at the tip of the tower) supporting such a structure on a floating body makes it extremely difficult to control its stability. The industry practice is that the angle of rotation of the tower should not exceed certain limits (usually 10 degrees). This is too difficult to meet for a single floating turbine, because the floater base dimension is small as compared to the tower height, which is at least twice that of the base diameter. The moment of inertia of the base is therefore inadequate to control rolling and pitching movements of the floating platform.

Several methods have been developed to solve the problem. The first is known as a "Tension leg" process. Here, the floating platform is tied down by mooring lines to the seabed anchor in order to resist the uplifting forces induced by buoyancy of the platform, such that the overturning moment is balanced by the variation of the tension force in the mooring lines. The system was developed by Blue H Engineering BV of Nieuwvliet, The Netherlands.

A second method employs an adjustable water ballasting floater system. Here, the water ballast between floaters of a floating platform is adjusted in order to balance the overturning moment. An example of this is the WINDFLOAT® floating foundation for offshore wind turbine manufactured by PRINCIPLE POWER® Inc. of Emeryville, Calif.

Another system which is designed to address the inadequacy of the moment of inertia of a base to control rolling and pitching movements of a floating platform is the HYWIND™ Spar design for EQUINOR™ ASA of Stavenger, Norway. This system is designed to have the center of gravity (C.G.) located below the float center by using a steel rod extended from the bottom of the platform downward into the deep sea, with a heavy mass attached to the end of the rod so as to lower the C.G. below the float center. As the steel rod used by HYWIND is over 100 m in length, it only suits deep water sites. In addition to the above, MITSUBISHI® Heavy Industries is testing a floating platform known as Fukushima Mitai for supporting a single turbine.

Wind farms are formed by a plurality of single floating turbines dispersed in a vast stretch of ocean. If the wind field has a dominant wind direction, the wind turbine spacing in the perpendicular direction of the wind can be taken as 1.8 D to 3.0 D, whereas the turbine spacing in the direction along the wind has to increase to 6.0 D to 10.0 D, where D is the diameter of the rotor blades of the turbine. This great separation is adapted to avoiding the wake shadow of the upwind turbines cast on the down wind turbines. The wake effects cause the potential power loss of the downwind turbines as well as imposing fatigue loads on the downwind turbines.

If the wind field has no dominant wind direction, there will be at least one direction that the upwind turbine wake shadow will cast on the downwind turbines. If the spacing is maintained too short, the loss from the wake effect will be large. Therefore the spacing is kept to 6.0 D minimum. Additionally, for a modern large-scale wind turbine, the rotor diameter of the turbine is typically over 50 m. In this case, the diameter could be at least 300 m to 500 m. Moreover, as there is also an underwater cable of great length linking the turbines together, the resistance of this long underwater cable will cause loss in power transmission.

The wind at sea usually has no dominant direction. In order to catch the maximum wind energy, the turbine rotor should be oriented perpendicular to the wind direction. The concept of putting several turbines on a rotational platform to align with the wind is now evolving, as exemplified by the conventional efforts described below.

For example, WINDSEA™ AS of Sandvika, Norway has developed a concept of placing three turbines on a triangular platform with a turning axis located in the center. The platform base is small in comparison with the tower height; therefore, the problem of stability of the platform, together with wind wake loss, remain un-resolved.

Another arrangement, the SMWS concept developed by MOELLGAARD ENERGY™ of Denmark, consists of a great triangular tubular structure supporting three turbines, each mounted at each vertex thereof. One vertex of the tubular structure is anchored to the seabed with mooring lines, so that the entire structure can swivel or pivot around the anchored corner following a changing wind direction. Since this triangular tubular structure is very large, the swindling around one corner will produce a very large sweeping area which may post a danger to other marine users.

Hexicon AB Corp. of Stockholm SWEDEN is testing a multi-turbine floating platform with the turret located at the center of gravity (C.G.), with the platform turned by an electrically-powered turning mechanism. The self-push turning requires a kind of reaction from the seabed, hence a heavy mooring system is employed. The HEXICON platform also needs a power source to operate the turning mechanism.

Referring to co-applicant Carlos Wong's PCT Publication No. WO2016/004739A1 (the "'739 publication"), published Jan. 14, 2016 and entitled "WIND TRACING, ROTATIONAL, SEMI-SUBMERGED RAFT FOR WIND POWER GENERATION AND A CONSTRUCTION METHOD THEREOF", the entire contents of which are incorporated by reference herein, there is described a raft being any of a Triangular, Star, Tee, or Trapezoidal-shaped configuration, each configuration having wind turbines supported by floaters at corners or vertices of the raft so that the raft follows the changing wind direction. The raft rotation is about an eccentric swivel point formed by mooring lines linking the bottom of the floaters and a swivel device offset from the C.G., in order to create an eccentricity for the turning mechanism. These configurations are designed to apply to waters greater than 50 m deep, otherwise the mooring lines that connect the floater bottoms to the swivel device will have to follow a slope that may be too flat to restrain the platform from drifting away too much before it stops.

As to be fully described hereafter, the example embodiments of the present invention apply to all water depths, especially shallow and medium water depths, by offering various self-aligning (to the wind) floating platforms adapted to support multiple wind turbines of a wind power generation unit, based on completely new principles and designs.

SUMMARY

An example embodiment of the present invention is directed to a self-aligning to wind floating platform supporting multiple wind turbines (17, 18) for wind power generation. The platform may include at least three floaters (11, 11/101 or 103) and three connection beams (13), each beam (13) arranged between adjacent floaters (11, 11/101 or 103). The platform may include at least three wind turbines (17, 18), each being supported on a corresponding floater (11, 11/101 or 103), each wind turbine subject to a wind load. The platform may further include a rotation axle (150, 503) fixed to the seabed (2) and adapted to restrain the platform from drifting away while permitting rotation. Namely, a wind load resultant of the three wind loads on the turbines (17, 18), due to a horizontal wind, does not pass through the center of geometry (C.Geo) and the rotation axle (150, 503) simultaneously, and a yaw moment is created to turn the platform until the wind load resultant passes through the C.Geo and the rotation axle (150, 503).

Another example embodiment is directed to a self-aligning to wind floating platform for wind power generation that has a plurality of turbines (17, 18), each supported on a corresponding floater (11, 11/101 or 103), each wind turbine subject to a wind load. The platform also includes a rotation axle (150, 503) fixed to the seabed (2) and adapted to restrain the platform from drifting away while permitting rotation. Each of the turbines (17, 18) is substantially perpendicular to the wind direction and stable, as a wind load resultant simultaneously passes through the C.Geo and the rotation axle (150, 503).

Another example embodiment is directed to a self-aligning to wind floating platform for wind power generation that has a plurality of turbines (17, 18), each turbine supported on a corresponding floater (11, 11/101 or 103), each turbine oriented in a direction facing the wind, the turbines divided into two rows along the wind facing direction, a front row and a back row, the front row being hit by the incoming wind first. The platform also includes a rotation axle (150, 503) fixed to the seabed (2) and adapted to restrain the platform from drifting away while permitting rotation. Any wind turbine (17, 18) in the front row is arranged such that its wake does not affect the rear row wind turbines (17, 18).

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

FIG. 3(a) is a perspective view of an inverted conic or triangular-shaped non-linear type 2 floater having a C.G.-located rotation axle, with a tower thereon.

FIG. 3(b) is a plan view of the non-linear type 2 floater with tower as shown in FIG. 3(a).

FIG. 4(a) is a perspective view of an inverted conic or triangular-shaped non-linear type 1 floater having a C.G.-located rotation axle, with a tower thereon.

FIG. 4(b) is a perspective view of a cylindrical-shaped size 1 floater having a C.G.-located rotation axle, with a tower thereon.

FIGS. 7(a) and 7(b) are top plan views of the star-type floating platform to explain the turning mechanism according to the example embodiments.

FIGS. 8(a) and 8(b) are side elevational views of a floating platform to illustrate foundation loading with a single plied turbine, according to the example embodiments.

FIGS. 13(*a*) through 13(*c*) are selected illustrations of the slot in the rotation axle assembly, according to the example embodiments.

FIG. 14 is a side elevational view of the floating platform for purposes of describing installation of the sleeve-joined rotation axle.

DETAILED DESCRIPTION

Figure 1:
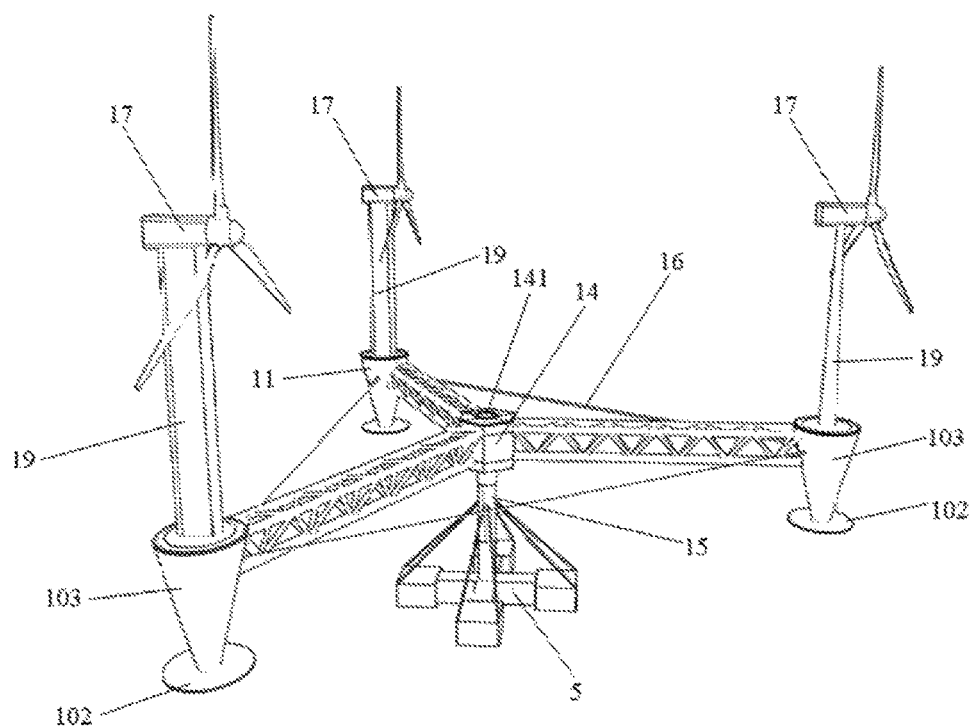
FIG. 1 is a perspective view of a self-aligning (to the wind) star-type floating platform adapted to support three (3) wind turbines of a wind power generation unit thereon, according to an example embodiment.

As used herein, the term "floater" refers to a floating structure in a body of water on which a wind power turbine may be mounted thereon. As used herein, the phrase "self-aligning to wind" means that the turbine rotor blades' rotating surface is perpendicular to the incoming wind. Additionally as used herein, the term "wind tracing" means a turbine turning to the designated direction following the change of the wind direction. Hereafter, the center of gravity or "C.G." means the center of gravity of any mass in the described subject matter. Further, the center of geometry or "C.Geo." means the center of geometry of the wind load receiving areas for the described subject matter.

The example embodiments to be more fully described hereafter are directed to a self-aligning to wind floating platform supporting multiple wind turbines for wind power generation, the platform adapted to be deposited in a body of water to generate electricity, as well as the platform's application in offshore wind farm. Additionally, the example embodiments describe a fabrication and construction method therefor.

In general, and in a basic configuration, the example embodiments to be described in detail hereafter are directed to a platform designed to support a plurality of wind power generation turbines thereon. The platform is self-aligning to the incoming wind, namely the rotor rotation plane in this direction is called wind facing such that the turbine rotors are always facing the incoming wind, or the plane of the rotating rotor blades is closely perpendicular to the incoming wind. Additionally, a wind farm comprising these self-aligning to wind offshore floating platform (hereafter referred to as a "unit" for simplicity) supporting multiple turbines is contemplated, the platform further incorporating a plurality of solar panels.

| Parts List. | |
|---|---|
| 1 | sea surface |
| 2 | seabed, seafloor |
| 3 | excavated trench |
| 4 | soil, clay |
| 5 | gravity base/gravity anchor |
| 6 | stone/sand regulation layer |
| 7 | concrete bedding |
| 11 | floater size 1 |
| 12 | floater size 2 |
| 12A | auxiliary floater |
| 13 | connection beam/long beam |
| 13A | connection beam, short beam |
| 13B | structural strut |
| 14 | central node |
| 15 | rotation or turning axis |
| 16 | steel wire |
| 17 | wind turbine (size 1) |
| 18 | wind turbine (size 2) |
| 19 | tower (shape 1) |
| 20 | tower (shape 2) |
| 41 | power output cable |
| 42 | slip ring |
| 43 | guide tube |
| 44 | submarine cable |
| 49 | solar panel |
| 61 | pile |
| 90 | wind load resultant location |
| 101 | non-linear floater type 1 |
| 102 | damping plate |
| 103 | non-linear floater type 2 |
| 141 | hollow core - central node |
| 150 | rotation axle (upper part) |
| 151 | impact ring |
| 152 | rubber fender |
| 153 | bolts |
| 154 | bolted flange |
| 157 | concrete infill |
| 156 | conduit |
| 159 | compressible material |
| 160 | penetration stopper |
| 161 | stiffener |
| 501 | open top weight box |
| 502 | beam |
| 503 | rotation axle (lower part) |
| 504 | concrete infill |
| 505 | concrete or cement grout |
| 506 | fin |
| 507 | stayed wire |
| 508 | seafloor anchorage |
| 513 | suction bucket |
| 517 | pressure grout |

Because the unit can support multiple turbines, it can be viewed as a giant turbine. According to one example embodiment, the unit for offshore wind farm may include a semi-submersible raft formed by at least three vertically aligned cylindrical hollow columns (each hereafter called a "floater") inter-connected by beams, with at least three wind turbines, each erected on one of the corresponding floaters.

In one aspect, the each of the three floaters occupy each respective vertex of a triangle-type floating platform, especially an equilateral triangle. The floaters are interconnected by long beams between adjacent floaters. A central node in the C.G. of the triangle is connected by short beams to each mid-span of a long beams, the central node housing a rotation axle.

In another aspect, the three floaters occupy each respective vertex of a triangle in a star-type floating platform. The platform has three beams, each of which connects to a floater and meets at a central node located at the C.G. of the triangle, and the central node houses the rotation axle. The floaters are stiffened by steel cables connecting every pair of adjacent floaters.

The rotation axle (which may be embodied in the form of a rigid shaft such as a pipe-like structure) is fixed to the seabed and passes through an impact ring in the central node. Since the impact ring is set at the C.G. of the triangle, the rotation axle is close to the C.G. of the platform. The rotation axle restrains only the horizontal movement of the platform, otherwise the platform is completely free in a floating state.

According to one or more example embodiments as to be more fully described hereafter, a wind tracing offshore floating platform supporting multiple wind turbines of an offshore wind farm may include wind turbines in a front row having a different power rating than those turbines forming a rear row on the platform. Additionally, the front and rear row turbine towers may be of different shapes or profiles, such that wind loads acting on the front row turbine towers is different from those wind loads acting on the rear row turbine towers.

For a symmetrical layout of wind turbines subjected to uniform wind distribution, the wind load is equal for all wind turbines and towers, such that the action point of the wind load resultant acts along the center line of symmetry and coincides with the triangle-type platform C.G. which also is where the rotation axle happens to be located. In this situation, the wind load resultant produces no turning moment about the rotation axis. The floating platform thus remains stationery.

In reference to turbine power generation ratings, for an offshore floating platform of the star-type or triangle-type configurations, the wind facing direction can be set with one turbine in a front row and two turbines in a rear row. The two rear row turbines each have a larger power rating than the front turbine, so that the wind load resultant on the turbine rotors will fall close to the rear turbines, away from the C.G. Furthermore, the front row turbine tower shape may be set so as to be different from that of rear turbine tower shape. In this multi-shape tower set-up the front row turbine tower thus attracts lesser wind load than that of the rear turbine towers. Combined wind loads on the three turbine rotors plus towers will have a wind load resultant that is shifted away from the C.G. and is located closer to the rear turbines.

Accordingly, the shifting of the wind load resultant away from the C.G. by combining differences in turbine rotor size and tower shape will enhance the self-aligning mechanism. As the wind comes in at an angle to the center line of the platform, the wind load resultant is offset from the C.G. (and also offset from the rotation axle). The wind load resultant therefore produces a righting yaw moment about the rotation axle to drive the floating platform to turn back, until the wind load resultant is passing through the rotation axle, after which the turning moment vanishes.

In reference to tower shape, optionally, the tower shapes of the front and rear row turbines may be different in order to utilize the difference in wind drag coefficients. This drag coefficient difference leads to a significant difference in catching the wind forces between the two rows of towers. One example configuration contemplated could be where the front row turbine tower cross section is circular (cylindrical shape), whereas the two rear row turbine towers have a double-sided bullet shape, or "DSB" shape. The drag coefficient for a cylinder or circular column is around 0.47, and remains unchanged for any wind direction. The drag coefficient for a DSB shape is at a minimum of 0.295 in the bullet direction and a maximum of more than 2.0 in the transverse direction across the bullet shape.

The combined effect of using larger power rated turbines in the rear row with each turbine tower in the rear row having a DSB shape is to deliberately create an off-center wind load. This off-center wind load drives the floating platform to rotate until it reaches the wind facing direction. For reference, this approach is completely different from that described in co-applicant Wong's '739 publication, where the rotation axis is set at an eccentric position. The example embodiments' arrangement of placing the rotation axis in the C.G. of the platform has benefits in that rotational inertia about the rotation axis is minimized. This makes it much easier to drive the platform to turn. The sea sweeping area is kept to the smallest or minimal area, thus causing less disturbance to other maritime usages.

In a further aspect and with reference to the connection beams, the sides of the triangle-type floating platform may be at least 2.2 D, where D is the diameter of the rotor. For a large scale turbine, e.g. a 5 MW rating or greater, the rotor is about 126 m in length, such that side length at 2.2 D becomes 277 m. Having such a long beam connecting two floaters makes it prone to be damaged by wave loads. In order to reduce these wave loads, the beams may be located under the water at a depth that is deep enough to avoid wave action, a depth contemplated to be about 14 m or greater.

The buoyancy of the beam on the other hand causes a significant bending moment if the two ends of the beam are being held down into the water in such a way as a simply support the connection beam. Therefore, each section of the beam has its buoyancy balanced by the beam self-weight or slightly more than the beam self-weight, so that the beam is in a state of suspension in the body of water. If the connection beam is built using steel, a massive water ballast has to be employed; hence the beam should be constructed with a much heavier material such as concrete, using bridge building technology.

For shallow water applications (water depth<30 m), there is no room for the connection beams to be submerged. Here, the beams should also avoid the sea surface, as they would easily be damaged by the wave. Thus, the beams have to be raised high enough to avoid the wave attack. Accordingly, for shallow water applications, the connection beams of the floating platform are made of a lightweight steel to connect adjacent floaters. In a variant, a central node in the C.G. of the star-type floating platform can house the rotation axle, such that the span of the connection beams can be reduced. This is further enhanced by using a truss for the beams in order to further reduce the wind loads.

An added benefit to the above-water beam set-up for shallow water is that optionally, solar panels can be installed on the top side of the beams. In an even bigger scale, a secondary support may be erected over the connection beams enclosing the triangular area of the platform for the support of megawatt-capacity solar panels, due to the size of the projected area of the platform.

With reference to the turning mechanism for the floating platform to be described in further detail hereafter, in one or more example embodiments, the platform includes an impact ring located in the center of the central node through which passes the rotation axle. The rotation axle may include a lower part composed of a steel pipe or steel pile fixed to a gravity base (also referred to as a gravity anchor) sitting on the seabed. The pipe/pile may be further stiffened by stayed cables. The gravity base in one aspect may be composed of concrete, and in another configuration may be embodied as an open top caisson with weight largely provided by stone and sand ballast. The stayed cables can be a self-anchor type by tying the cable to the gravity base, or the stayed cables can be tied to a sea floor with anchors.

In an alternative, the lower part of the rotation axle may be embodied as a steel pile driven into the soft seabed to an adequate depth so that the soil resists horizontal loads from the wind turbines. Here, the stayed cables are used to stabilize the pile with the cables being anchored into seabed.

In yet another aspect, the impact ring may include a plurality of rubber fenders attached to the inner wall of the ring and forming a circle around the ring, with a steel plate attached to the free ends of the fenders to permit the rotation axle to move freely.

A connection between lower and upper parts of the rotation axle may be by bolted flanges. Alternatively, the connection may be made by sleeve joint, where the upper part of the rotation axle is slightly larger in diameter than the lower part of the rotation axle (or vice versa); the upper part being inserted into the lower part (or vice versa) through the impact ring. The rotation axle shaft may be filled with concrete to increase its lateral strength.

In yet a further variant, the floating platform according to the example embodiments may include a fin added to the top face of the beam that points toward the designated wind facing direction in line with the center line of symmetry. In a star-type platform with two turbines in the front row and one turbine in the rear row, the fin would be added on the beam between the central node and the rear floater. In a triangle-type platform the fin is located between the central node and a mid-point of the long connection beam between the two rear turbines. The fin is used to catch more wind force acting eccentrically to enhance the righting yaw moment.

A non-linear floater is further envisioned for use in the example floating platform. Namely, this is a floater with variable cross section between its top and bottom sections. One aspect is to increase the buoyancy as the floater sinks into the water body, i.e., the top cross section is greater than the bottom section. Another aspect is to minimize the waterline area by locating the major buoyancy under water, i.e., bottom cross section greater than the top section.

Further, the example embodiments contemplate use of an eccentrically placed rotation axle in the platform. Namely, the rotation axle would be deliberately placed in an offset position along the wind facing direction so that the wind load resultant induces a self-righting yaw moment about the rotation axle. For the star and triangle configurations, the central node is located closer to the two rear turbines. Here, the wind loading elements for the turbine and towers are the same in both the front and rear rows, so that for a uniformly distributed wind speed spectrum the wind load resultant falls in the C.G. of the platform. With the rotation axle at a distance from the C.G. a torque is set up to provide a self-righting yaw moment to turn the platform until it stops at the wind facing direction.

With regard to deep water applications, in co-applicant Wong's '739 publication, wires were utilized to tie the bottoms of the floaters at one end and intersect and meet at a point offset from the C.G. of the platform. This arrangement created an eccentric rotation pivot to produce the righting yaw moment aimed at deep waters (50 m deep or greater). It has been discovered that the floating platform will drift too much if the slope of the wires are too flat.

Instead of using a platform configuration where the rotation axis is at the C.G. and the righting yaw moment is not produced by an eccentric rotation axis, but by an eccentric wind load resultant, the turret location is directly under the vertical line of the C.G. and the wires are tied between the turret and the bottom of each floater. Unlike in the '739 publication, here the righting yaw moment is produced by using differently rated turbines and different tower shapes to create an eccentric wind load resultant.

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size. In the drawings, identical reference numbers identify similar elements or acts. The size and relative positions of elements in the drawings are not necessarily drawn to scale.

Referring now to FIGS. 1 to 4(b), there is shown a self-aligning (to the wind) star-type floating platform adapted to support three (3) wind turbines of a wind power generation unit thereon, configured so as to have an inverted conic or triangular-shaped non-linear type 1 or type 2 floater, with differently shaped turbine towers. In one aspect, the floating star-type platform has a triangular shape formed by three (3) non-liner type 2 floaters 103 connected by three long or connection beams 13 meeting at a central node 14, and supports two rows of turbines. As shown in FIG. 1, the front row turbine 17 is smaller than the rear row turbines 17 sitting on the floater 103. The floaters 103 are thus connected to the central node 14 by connection beams 13. The rotation axis 15 is in the center of the central node 14.

Referring to FIGS. 3(a) and 3(b), there are shown different shapes of tower (cylindrical, DSB) and floater (group 1) that have different values on the drag coefficients CD in X and Y directions. Namely, FIG. 3(b) is an isometric or plan view of a non-linear type 2 floater 103 with damping plate 102 supporting a DSB-shaped turbine tower 17 used in a triangle-type floating platform, with the rotation axle being in the C.G. and unequal turbine capacity using the same turbine layout as in the star-type platform.

FIGS. 4(a) and (b) are provided to highlight that different shapes of tower 17 and floater (group 1) that will have different values on the drag coefficients CD in X and Y directions, shows a 3D perspective view of a wire frame model for the triangle-type floating platform.

Figure 5:
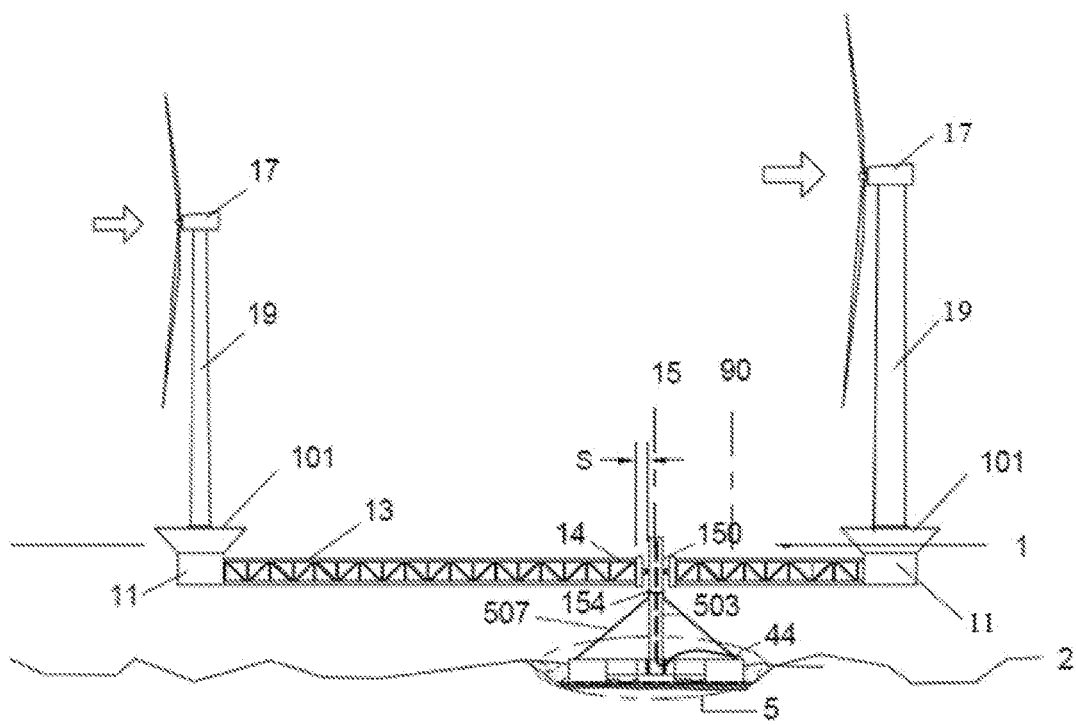
FIG. 5 is a side elevational view of a self-aligning (to the wind) triangle-type floating platform with a gravity anchor-type rotation axle adapted for shallow water, with non-linear type 1 floating supporting towers thereon, according to another example embodiment.
Figure 6:
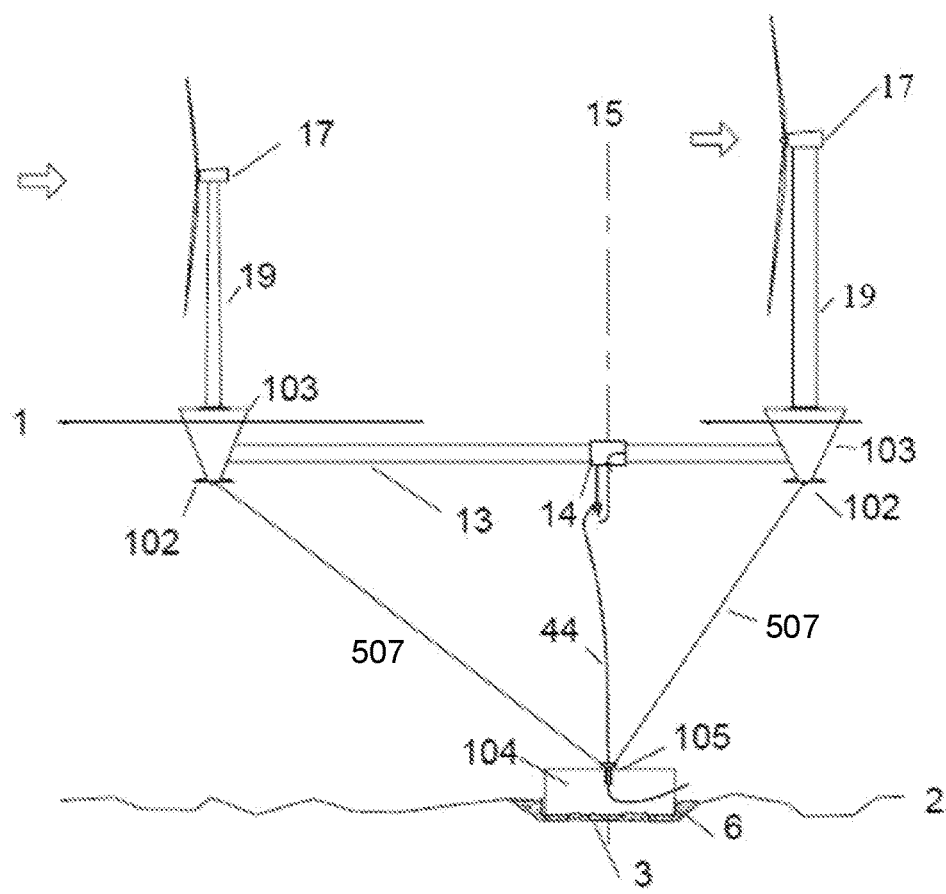
FIG. 6 is a side elevational view of a self-aligning (to the wind) floating platform with a gravity anchor-type rotation axle adapted for deep water, with non-linear type 2 floating supporting towers thereon, according to an example embodiment.

FIG. 5 is a side elevational view of a self-aligning (to the wind) triangle-type floating platform with a gravity anchor-type rotation axle adapted for shallow water, with non-linear type 1 floating supporting towers thereon, and FIG. 6 is a side elevational view of a self-aligning (to the wind) floating platform with a gravity anchor-type rotation axle adapted for deep water (>50 m), with non-linear type 2 floating supporting towers thereon. In FIG. 5, there is shown smaller turbine 17 on a circular tower 19 in the front of the platform, and a larger turbine 17 on a DSB-shaped tower 19 in the rear. Floaters (designated by 11) are combination of hollow cylinder and non-linear type 1 floater 101 (without damping plate 102). Connection beams 13 are in the water (submerged), indicating that the water depth is at least medium depth. A gravity base 5 (or gravity anchor 5) is founded on an excavated ditch. A lower part 503 of the rotation axle is planted in the gravity base 5 and joined by the upper part 150 of the rotation axle using bolted flange plates.

FIG. 6 also shows a platform with smaller turbine 17 on a circular tower 19 in the front and bigger turbine 17 on double-side bullet shaped tower 19 in the rear. However this configuration is set up for deep water. Here, there is shown non-linear type 2 floaters 103 with damping plates 102 for deep water applications (>50 m in depth), where the fixed point 105 on a turret 104 is directly under the projected point of the rotation axis 15. Each floater 103 in turn is connected to the turret 104 via a stayed wire 507, one end of which is attached to the bottom of the floater 103. The return ends are fixed at the common point 105 on turret 104 (here serving as a gravity base/gravity anchor on seabed 2).

FIGS. 7(a) and 7(b) are top plan views of the star-type floating platform to explain the turning mechanism according to the example embodiments. Since the axle 15 is set at the C.G. of the platform, uniform wind load on the equal rating turbines 17 will not produce any yaw moment about the axle to turn the platform. This is because the line of wind load resultant passes through the C.G., i.e., passes through the axle 15. FIG. 7(a) illustrates the wind coming at angle with the platform center line 202 and the wind resultant force F acts at the point 90 at an eccentricity E, with the rotation axis 15 inducing a righting moment M=F*E (E is the lever arm) to turn the platform until it is oriented in the wind facing direction, as shown in FIG. 7(b) for example.

Figure 2:
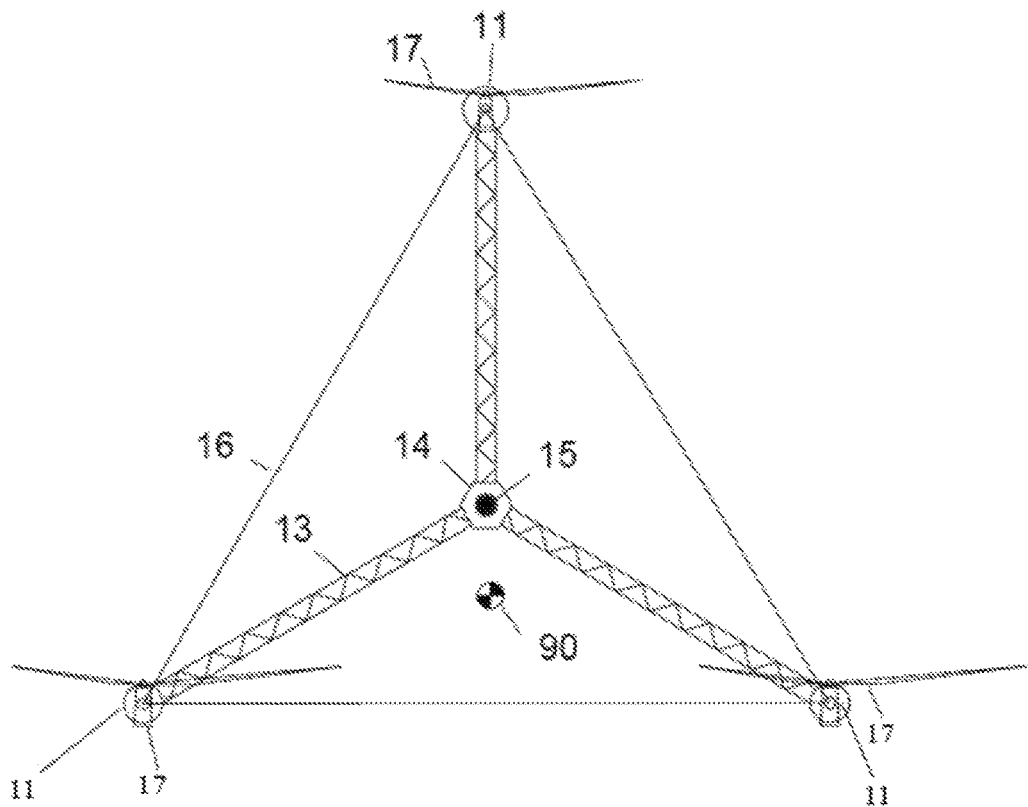
FIG. 2 is a top plan view of the platform shown in FIG. 1.

Using the star-type platform of FIG. 2 as an example, the diameter of the front turbine rotor is 80% that of the rear turbine. The wind load on the rotor blades is in proportion with the sweeping area of the rotor blades, e.g. 5 MW for the two rear turbines, and 3 MW for the front turbine. Taking the moment about the baseline passing through the center of the rear turbines, then the distance X between the C.Geo. 90 and the baseline is computed by:

$$F_2 = (0.8)^2(F_1) = 0.64F_1$$

-continued $$X = \frac{0.64F_1 \times h}{2F_1 + 0.64F_1} = 0.241h,$$

Where $F_1$ and $F_2$ are the wind loads on the rear and front turbines respectively, and h is the height of the triangle. The rotation axis 15 is located in the C.G. at a distance equal to 0.33 h, eccentricity of the applied wind load becomes 0.33 h−0.241 h=0.109 h. The eccentricity will be further increased if different shapes of tower cross section are used.

FIGS. 8(a) and 8(b) are side elevational views of a floating platform to illustrate foundation loading with a single plied turbine, according to the example embodiments. These figures show the comparison of the present multi-turbine floating platform described herein, with the popular single piled fixed foundation turbine of their corresponding mud line force F and bending moment M. Total wind load of the 3 turbines on the platform is (assuming the rotor sweeping area of the front turbine is 0.8 times of the rear turbine):

$$2F+(0.8)^2F=2.64F,$$

and the overturning moment at the bottom of the floater is $$2.64F \times H = 2.64F\,H,$$

where H is the height of the tower. The overturning moment is counteracted by the variation of the buoyancy between floaters. The buoyancy variation f w and the mud line overturning moment M are:

$$f = w = \frac{2.64FH}{L}$$

$$M = 2.64 \times d, \text{ and}$$

$$M = F \times (H+d)$$

In the single piled supported turbine, the mud line horizontal load is F1 and the overturning moment M at the mud line level is:

$$M=F_1 \times (H+d)$$

where d is the water depth. The H is greater than the d in most of the cases for bottom fixed turbines. Typically H is more than 100 m for multi-megawatt turbines, whereas the sea depth is between 10 to 30 m for piled turbines. For example, a turbine requires a tower height of 100 m when installed at sea, where water depth is between 15-30 m. The static wind load at the mud line level for both cases are:

TABLE 1

COMPARISON STATIC WIND LOADS

| Comparison of mud line wind loads | Horizontal Load | Overturning moment |
|---|---|---|
| Present floating platform | 2.64 $F_1$ | 2.64 $F_1$*15 = 39.75 $F_1$ |
|  |  | 2.64 $F_1$*30 = 79.2 $F_1$ |
| Single piled turbine | $F_1$ | $F_1$*(100 + 15) = 115 $F_1$ |
|  |  | $F_1$*(100 + 30) = 130 $F_1$ |

The comparison in Table 1 shows that the mud line overturning moment for the presently-described floating platform is less than that of the single piled bottom fixed turbine, although the horizontal load is higher in the floating platform due to the fact of having three turbines, the horizontal load will be resisted by the friction between the gravity base 5 and the seabed 2 or further by mooring anchors.

The requirement for geological conditions in the seabed 2 is minimum for this platform. If the DSB-shaped tower is used with its long axis in line with the wind facing direction, any wind direction other than that in line with the designated wind facing direction will produce a wind load resultant shifted away from the C.G., and a yaw moment is created to turn the platform. This is because the DSB-shaped tower attracts more wind load due to its bigger wind catching area and a larger drag coefficient, as compared to a turbine tower with a circular cross-section.

Figure 9:
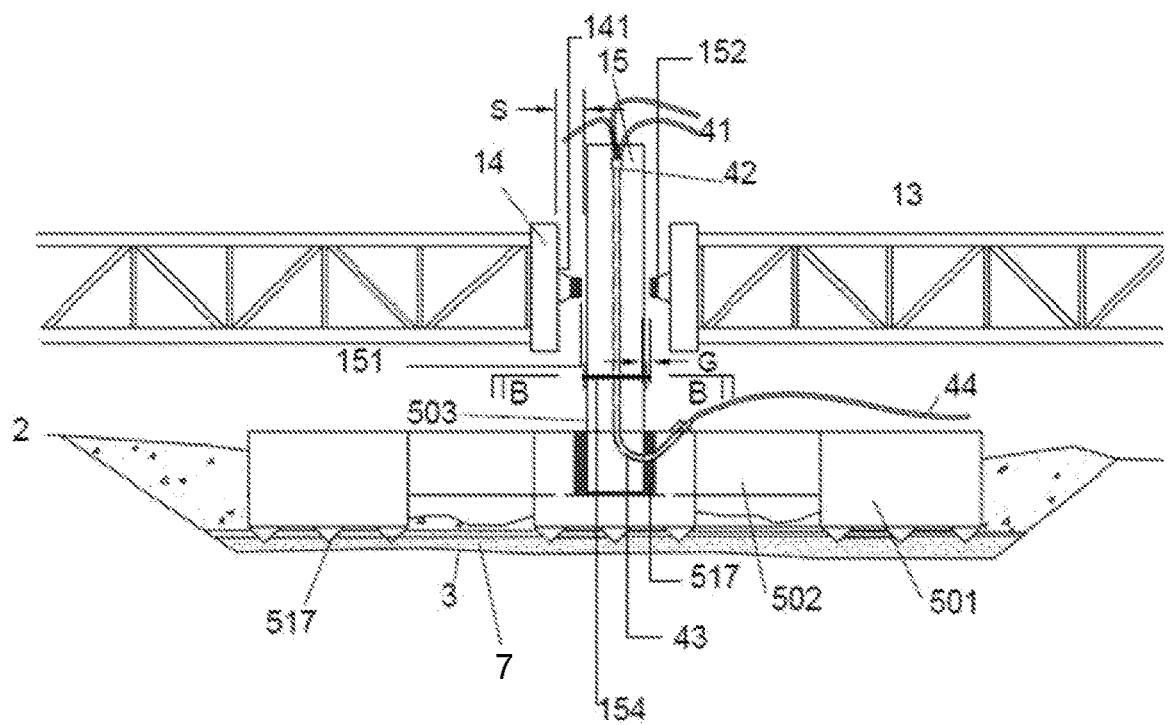
FIG. 9 is an expanded close-up view of a floating platform to illustrate constituent components of the rotation axle in the gravity anchor in further detail, according to the example embodiments.

FIG. 9 is an expanded close-up view of a floating platform to illustrate constituent components of the rotation axle in the gravity anchor in further detail, according to the example embodiments. Namely, FIG. 9 shows details of the gravity base 5, which sits on concrete bedding 7 with shear keys 517 cast into the concrete bedding 7. The excavated trench 3 is only necessary when there is a layer of soft soil in the seabed 2.

There are many possible designs for the gravity base 5 (or gravity anchor 5). The design shown here in an example may be four rectangular blocks of mass concrete or open-top boxes 501 filled with sand and aggregate ballast to provide a weight box 501. The weight boxes 501 are linked with beams 502 to form the gravity base 5. The lower part 503 of the rotation axle is fixed to the gravity base 5. The upper part 150 of the rotation axle is inserted into the central node 14 through the impact ring 151, to be connected to the lower part 503 by bolted flanges 154 and thereby complete installation of the rotation axis.

A power output cable 41 from the three turbines is connected to the moving terminal of a slip ring 42, and a submarine power cable 44 runs through a conduit or guide tube 43 (located at the center of the rotation axle) to the stationary terminal of the slip ring 42. In FIG. 9 a gap G represents the separation tolerance between the rotation axle lower part 503 and the steel impact ring 151. A separation distance S allows the floating platform to undergo rolling and pitching without touching the rotation axle and the interior wall of the hollow core 141 within the central node 14.

Figures 10A, 10B, 10C:
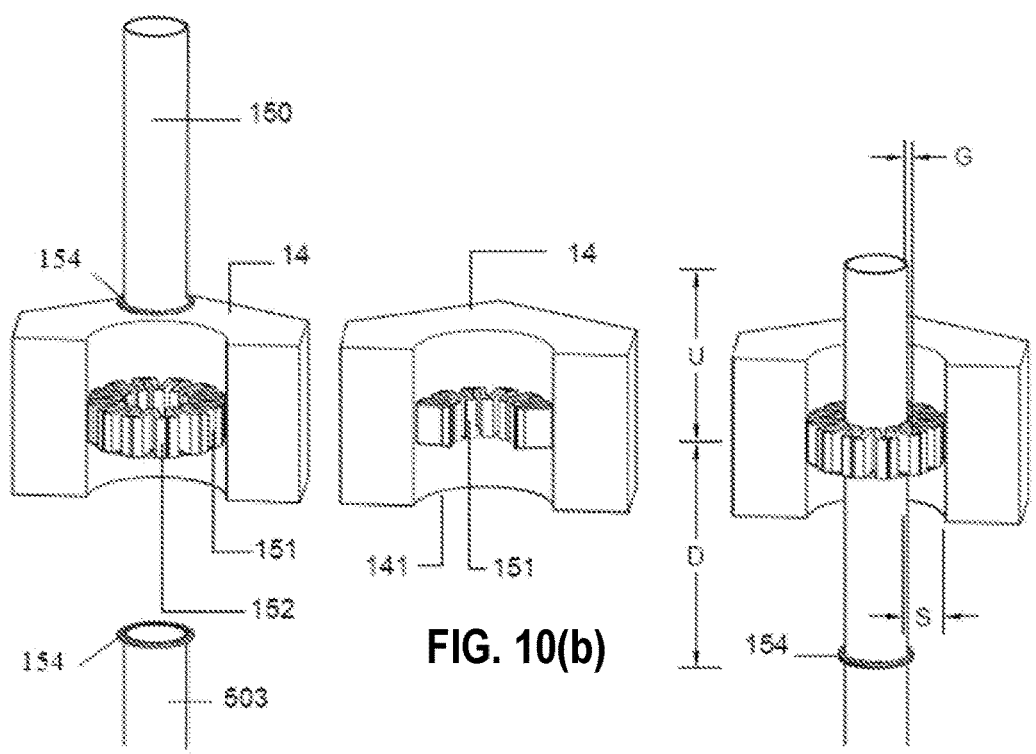
FIGS. 10(*a*) through 10(*c*) are selected illustrations to explain components of the impact ring in greater detail, according to the example embodiments.
Figure 11:
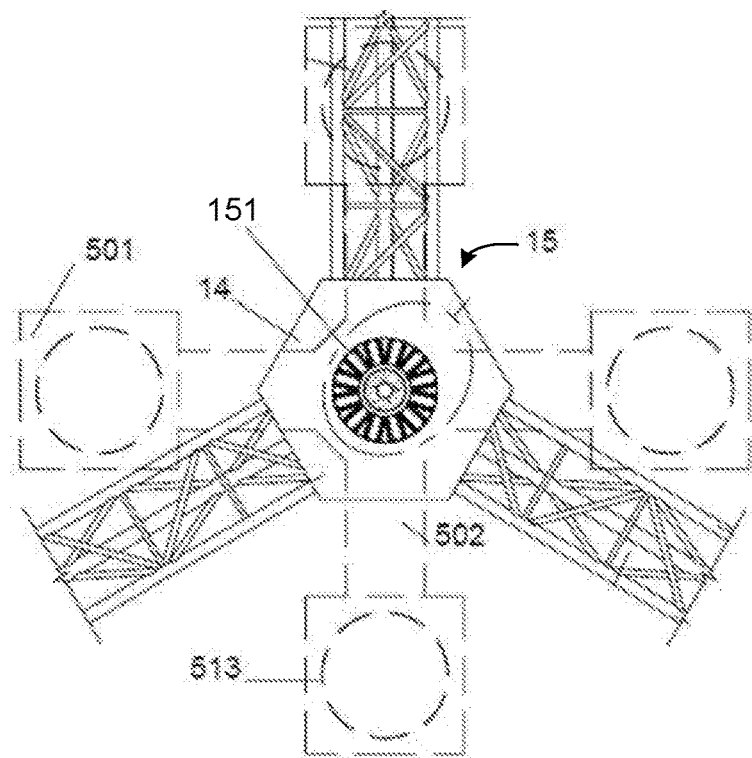
FIG. 11 is a top plan view of a portion of a floating platform to illustrate details of the central node according to the example embodiments.

FIGS. 10(a) through 10(c) are selected illustrations to explain components of the impact ring in greater detail, and FIG. 11 is a top plan view of a portion of a floating platform to illustrate details of the central node. Namely, the central node 14 houses the impact ring 141, thereby allowing the upper part 150 of the rotation axle to be loosely held with gap G (FIG. 10(c)) between the steel impact ring 151, which is backed back by the rubber fender 152 attached to the hollow core 141 of the central node 14. The upper part 150 and lower part 503 of the rotation axle are joined by a bolted flange 154 to form the rotation axis with sufficient over length U and D, so as to take into account variations in the water surface due to tidal fluctuation and wave action. A gap S is provided to ensure that the rotation axle will not touch the inner wall of the hollow core 141 within the central node 14, as the platform is titling under the action of waves. In FIG. 11 there is shown a plan view of central node 14 where, within the hollow core 141, each weight box 501 of the gravity base 5 includes a suction bucket 513 connected to a corresponding beam 502.

Figure 12:
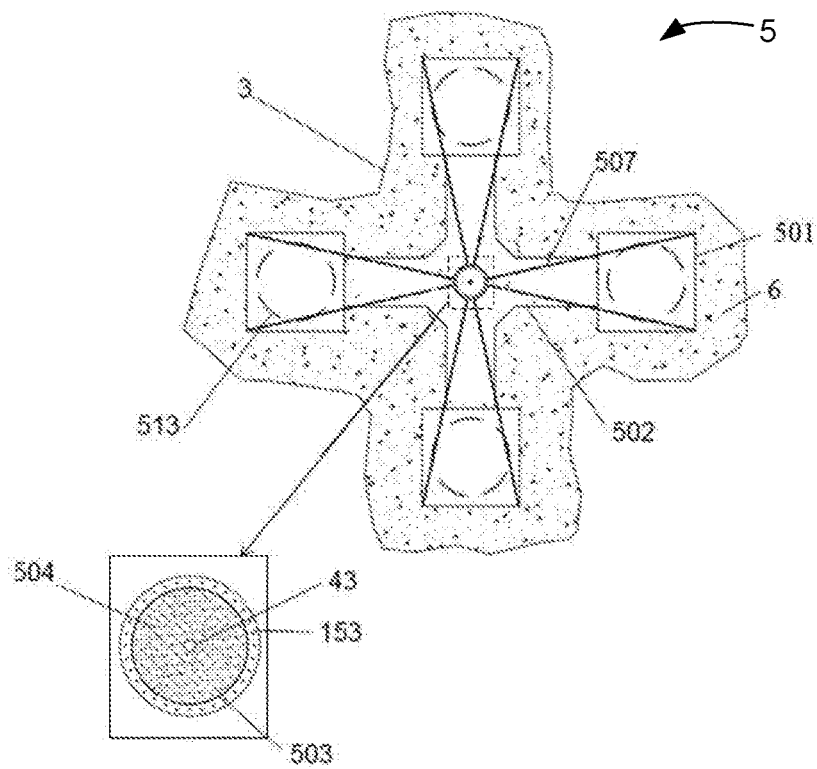
FIG. 12 is a top plan view of the gravity anchor according to the example embodiments.

FIG. 12 is a top plan view of the gravity anchor, and FIGS. 13(a) through 13(c) are selected illustrations of the slot in the rotation axle assembly, according to the example embodiments. The upper part 503 of the rotation axle may be fixed to the gravity base/gravity anchor 5 by various means. To provide further stability capacity to the rotation axle, a self-anchor system utilizing stayed wires 507 is activated. The selected illustrations in FIGS. 13(a) to 13(c) show a variation for rotation axle construction using a sleeve joint. Namely, the rotation axle comprises a larger-diameter lower part 503 and a slightly larger length but smaller-diameter upper part 150 that will be dropped into the lower part 503, thereby forming a sleeve joint.

FIG. 14 is a side elevational view of the floating platform for purposes of describing installation of the sleeve-joined rotation axle, and FIGS. 15(a) through 15(f) are selected illustrations to describe details of the slot in the rotation axle and the impact ring. Namely, FIG. 14 shows how the construction of the sleeve joint can be done. The platform is floated into the installation water, and the center of the central node 14 is aligned to the pre-installed fixed lower part 503 of the rotation axle in the seabed anchor block (gravity anchor 5). The upper part 150 of the rotation axle is lifted into the impact ring 151, and the part 503 is connected with either bolted flange 154 or sleeve joint (FIGS. 15(a) and (b) show a sleeve joint).

Figure 15A:
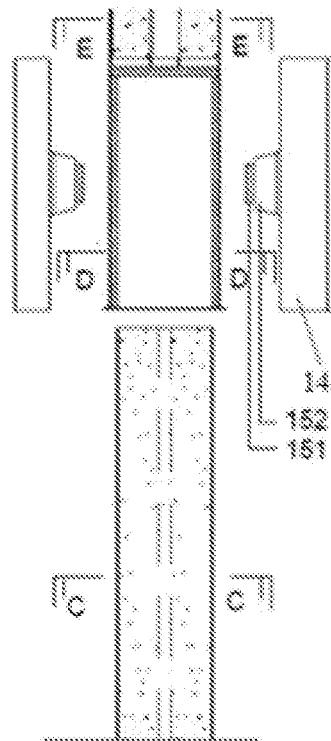
FIGS. 15(*a*) through 15(*f*) are selected illustrations to describe details of the slot in the rotation axle and the impact ring.
Figure 15B:
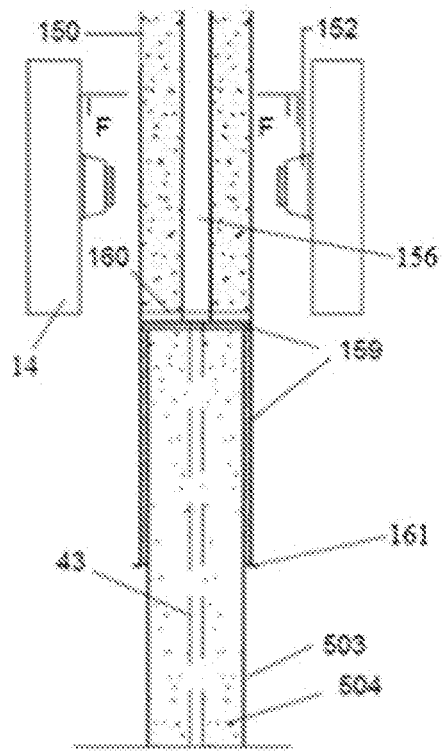
Figure 15C:
Figure 15D:
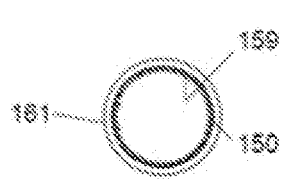
Figure 15E:
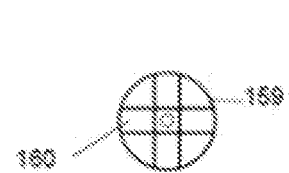
Figure 15F:
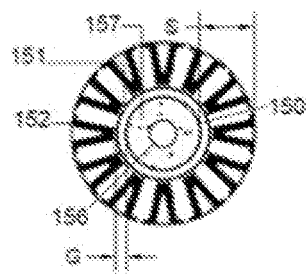

FIGS. 15 (c) to (f) are various cross-sectional views taken across line C-C (FIG. 15(c)), D-D (FIG. 15(e)), E-E (FIG. 15(d)), and F-F (FIG. 15(f)). For installation of the sleeve point, the central node 14 is aligned with the fixed lower part 503 of the rotation axle, then the upper part 150 is inserted over the lower part 503. In FIG. 15(e) there is shown a penetration stopper plate 160 provided to control the overlapping length, and compressible material 159 is provided in the internal faces of the upper part 150 of the rotation axle. Both parts 150, 503 of the axle are filled with concrete 504 and 157 respectively.

Figure 16:
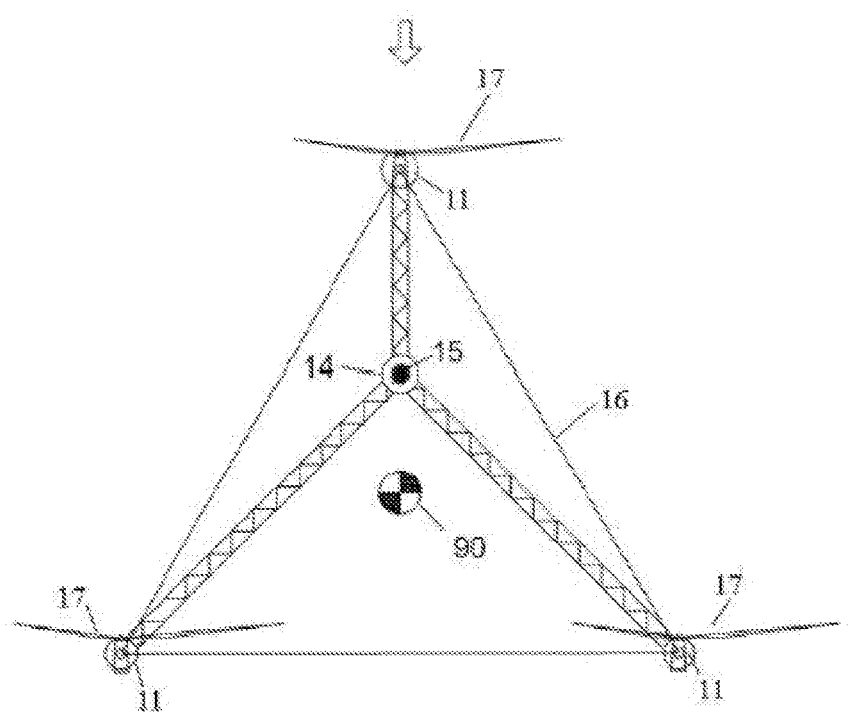
FIG. 16 is a top plan view of the star-type floating platform having an eccentrically placed rotation axle.
Figure 17:
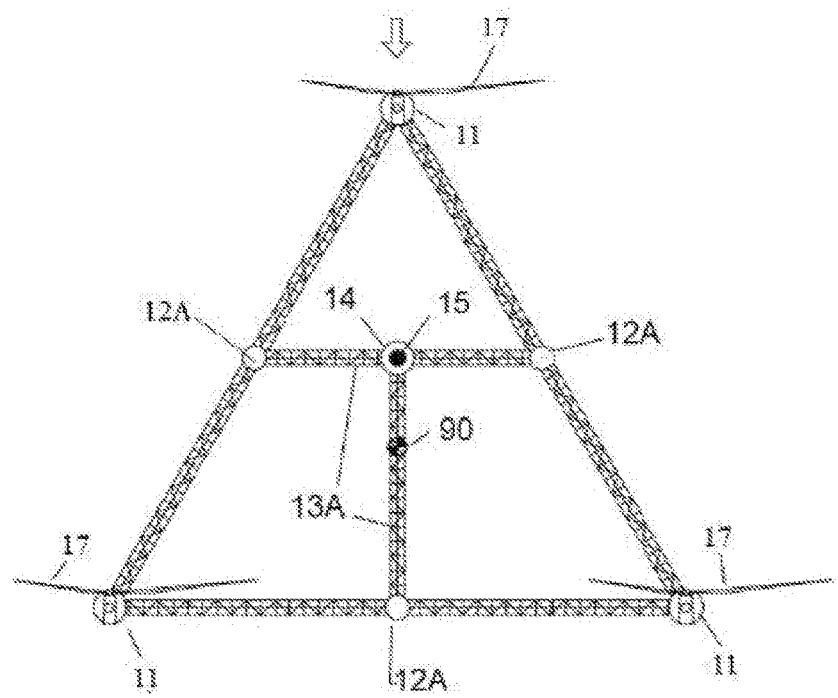
FIG. 17 is a top plan view of a self-aligning (to the wind) triangle-type floating platform adapted to support multiple turbines of a wind power generation unit thereon, the platform having an eccentrically placed rotation axle.

FIG. 16 is a top plan view of the star-type floating platform having an eccentrically placed rotation axle; FIG. 17 is a top plan view of a self-aligning (to the wind) triangle-type floating platform adapted to support multiple turbines of a wind power generation unit thereon, the platform having an eccentrically placed rotation axle. Both of these figures were described in co-applicant's '739 publication. In FIG. 16, the rotation axis 15 offset from the C.G. 90. Note that the three turbines 17 are of equal rating. In FIG. 17, the rotation axis 15 is also offset from the C.G. 90. Auxiliary floaters 12A and auxiliary beams 13A are also employed. Note that the three turbines 17 are of equal rating.

Figure 18:
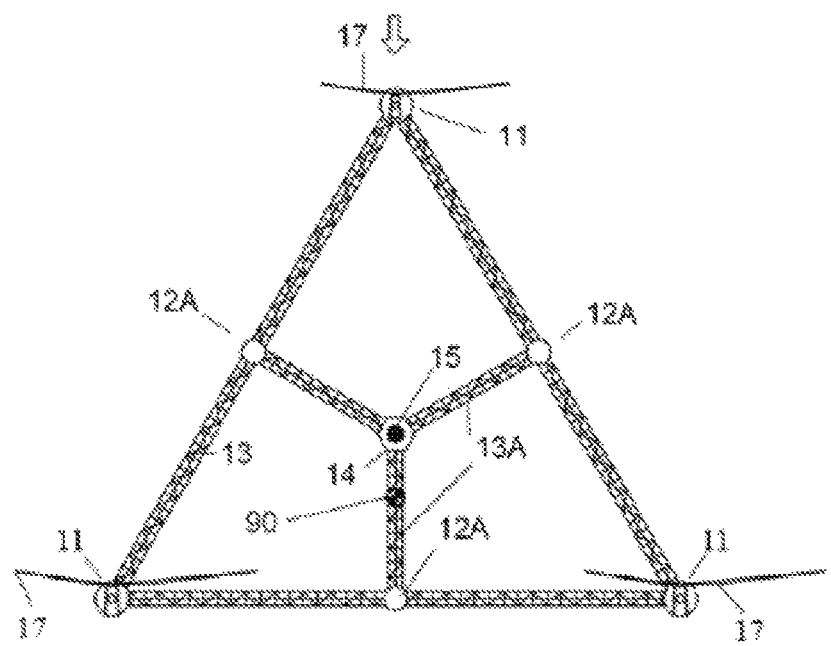
FIG. 18 is a top plan view of the triangle-type floating platform shown in FIG. 5.
Figure 19:
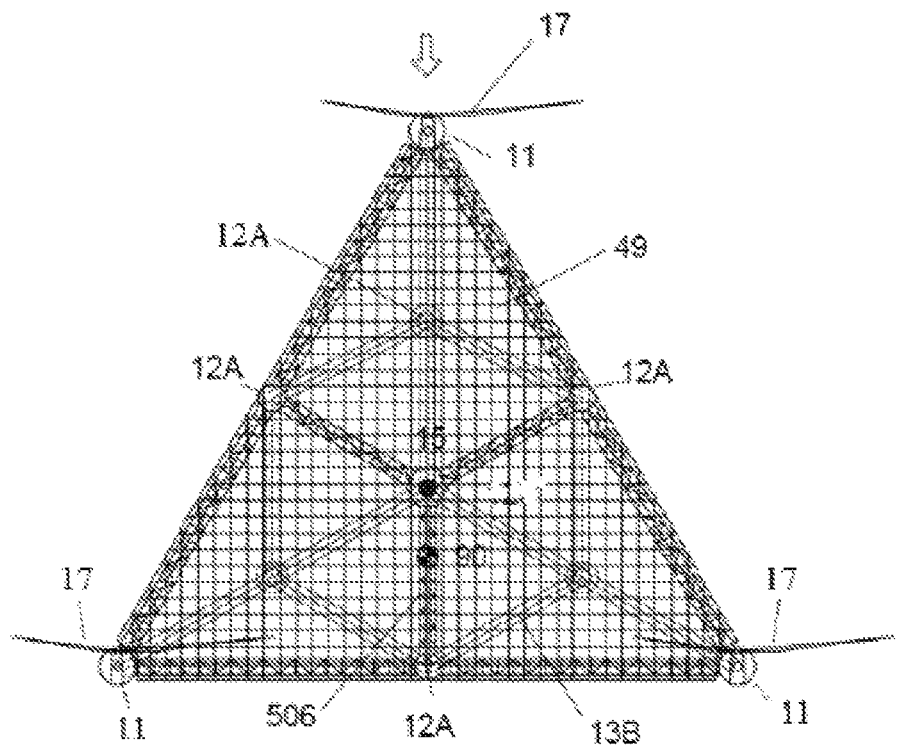
FIG. 19 is a top plan view of the triangle-type floating platform shown in FIG. 5, further incorporating multiple solar panels and a fin.
Figure 20:
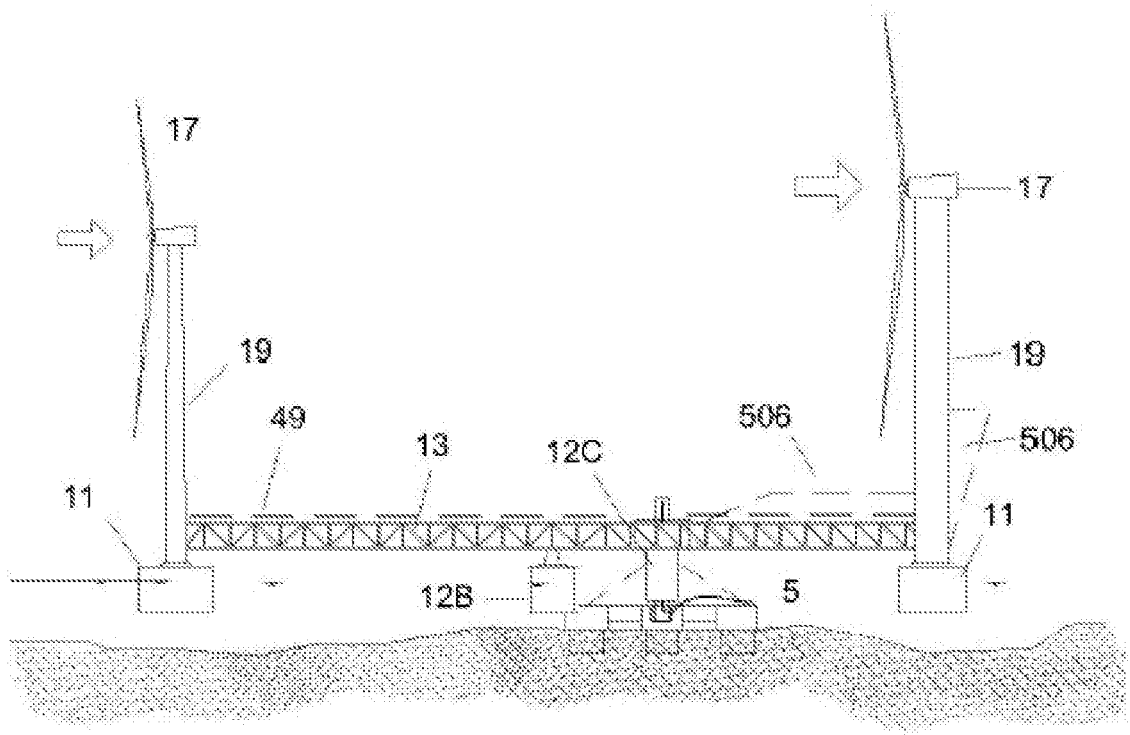
FIG. 20 is a side elevational view of FIG. 19 with the solar panels.

FIG. 18 is a top plan view of the triangle-type floating platform shown in FIG. 5, FIG. 19 is a top plan view of the same platform, but incorporating multiple solar panels and a fin, and FIG. 20 is a side elevational view of FIG. 19 with the solar panels. In FIG. 18, the rotation axle is in the C.G. the turbines have unequal turbine ratings, and a secondary floater-beam system 12A, 13A is provided to support the central node 14 in the C.G. of the platform with the rotation axis 15 also in the C.G. As mentioned above, to create a yaw moment when the platform is not wind facing, either the front and rear turbine must be of two different ratings, or the tower cross sections for the front and rear turbines must be of two different shapes, or both. It is possible to create a C.Geo of the wind load at a location 90 m away from the C.G.

In FIGS. 19 and 20, the triangle-type platform is shown with a secondary beam system 12A-C and 13A-B to support solar power panels 49 within its boundary, and with an optional tail fin 506. The connection beams 13 are above the water surface at a safety level away from typhoon wave. The optional solar panels 49 may be fixed to the top face of the beams 13. The gravity base/gravity anchor 5 is further enhanced by the suction buckets 513.

Figure 21:
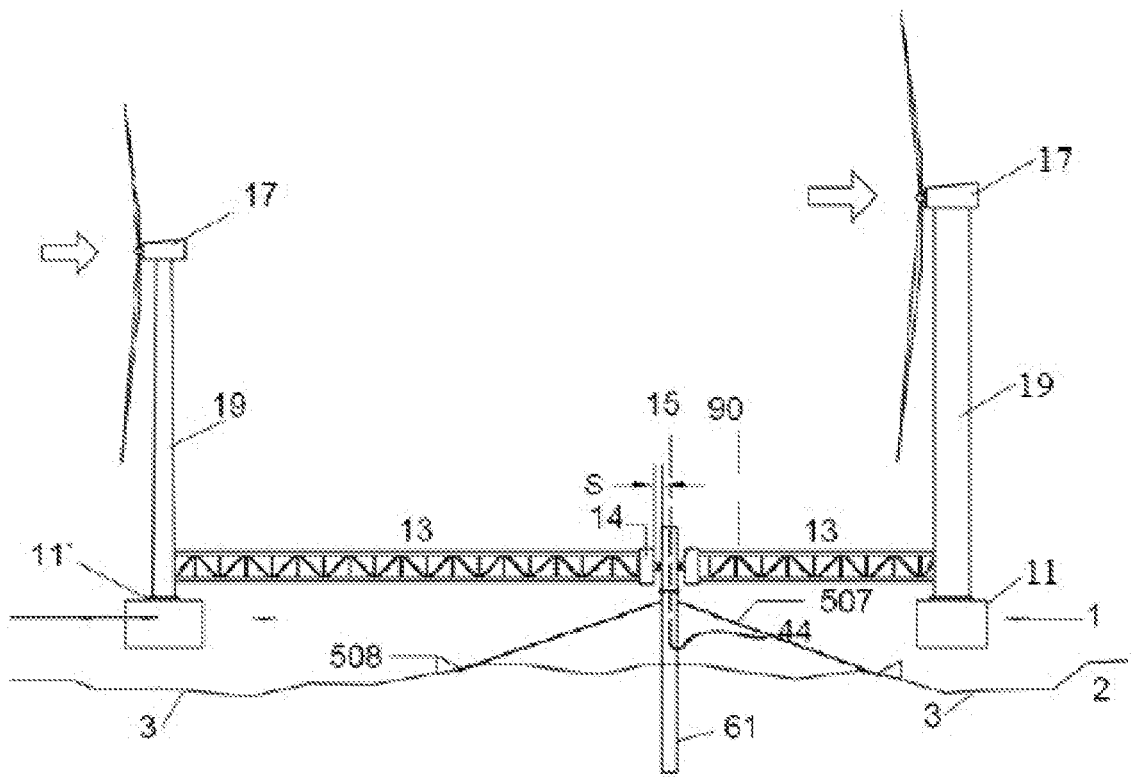
FIG. 21 is a side elevational view of the triangle-type floating platform in shallow water restrained by a pile as its rotation axle.

FIG. 21 is a side elevational view of the triangle-type floating platform in shallow water restrained by a pile as its rotation axle. The marine mud is excavated along the moving path of the floater 11, leaving the circular excavated trench 3 shown in FIG. 21. For shallow waters, the beams 13 remain above the water surface at a safety level, away from typhoon wave, whereas the rotation axle is formed by a pile 61 stiffened by stayed wires 507 with a seafloor anchorage 508 on the seabed 2. The submarine cable 44 runs inside the pile 61 and exits at the lower section of the pile 61.

Figure 22:
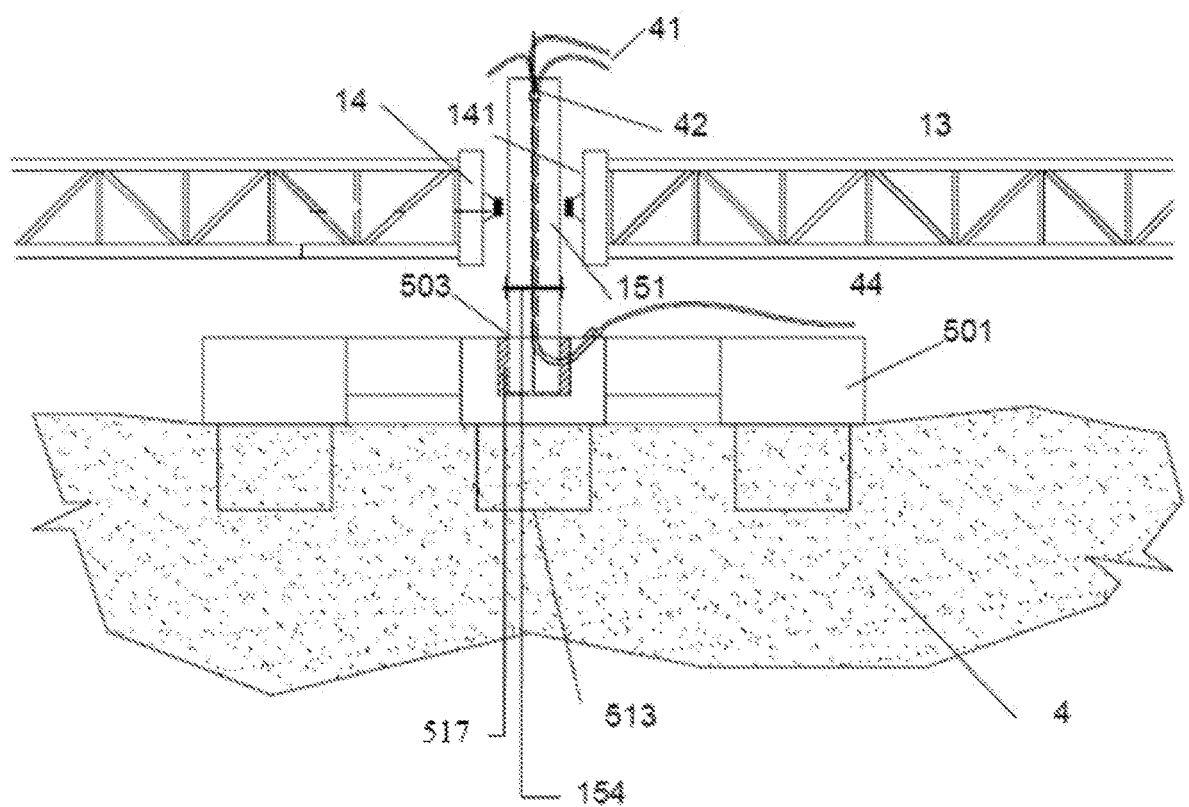
FIG. 22 is an expanded close-up view of a floating platform to illustrate constituent components of the gravity anchor-type rotation axle, as adapted for medium depth waters with suction cans.

FIG. 22 is an expanded close-up view of a floating platform to illustrate constituent components of the gravity anchor-type rotation axle, as adapted for medium depth waters with suction cans. Here, the gravity base 5 is enhanced by suction buckets 513; this applies to the seabed condition with a thick layer of soft material. The bottom of the base 5 can be fitted with steel rings or a concrete ring to form suction buckets 513 to increase the bearing and uplifting capacity.

Solar power generation estimate. For the connection beams 13 located above water level, the top face of the beams 13 can be installed with solar power pane, s 49 since the beam 13 is sizable. Taking a pointing downward triangular section for the beam 13, the width is in the range of 6-8 m and length for the long beam 13 is 223 m for a turbine rotor diameter of 100 m (see FIG. 18) and the length of the short beams 13A is 64 m long. The total area available for solar panel 49 installation is $3(223*8+64*8)=6,888$ m$^2$, which translates into solar power of installation capacity at $(180 \text{ W/m}^2)*(6,888)=1.23$ MW, given a standard conversion rate of 180 W per meter square.

If the entire triangular area bound by the three floaters 11 is installed with solar panels 49, the area available is 21408 m$^2$ (see FIG. 19), which translates into solar power of installation capacity of $(180 \text{ W/m2})*(21408)=3.85$ MW. It enhances the power generation capacity and forms a complimentary power source. If the increased number of auxiliary floaters 12A also increases the drag force, it is possible to install a tail fin 506 to increase the righting yaw moment.

Work Example 1. Using the star-type floating platform shown in FIGS. 1 and 2 as an example, the front turbine 17 is a smaller-rating turbine. Triangle side length is ½(D1)+D2+½(D1), where D1 is the larger sized turbine 18. Given a rotor diameter of 120 m for the 5 MW turbine in the rear row, and a rotor diameter 80 m in the front row, the side length of the triangle can be computed as $0.5*120+80+0.5*120=200$ m, say 223 m.

Floater 11/103 sizes should have adequate buoyancy to limit the rolling and pitching angle, and not to exceed the allowable rotation which is usually within 10°. According to NREL of the US, the overturning moment is 250000 kNm for a 5 MW offshore bottom fixed turbine. This overturning moment is resisted by the variation of buoyancy in the floaters. Based on the platform of FIGS. 1 and 2, the variation of buoyancy is $3*250000/223=3360$ kN. For a floater 11/103 having a 14 m diameter, the floater can generate this force by its vertical displacement of 2.2 m. This represents a rigid rotation of 1.1°, whereas the elastic rotation should be around 3°. Even allowing the floaters to move from each other vertically under the wave attacks, +/−4 m the total rolling and pitching is still within 10°.

Referring again to FIG. 2 as an example, the diameter of the front turbine rotor is 80% that for the rear turbine. The wind load on the rotor blades is in proportion with the sweeping area of the rotor blades, e.g. 5 MW (rotor length 126 m) for the two rear turbines and 3 MW (rotor length 100.8 m) for the front turbine. Taking the moment about the baseline passing through the center of the rear turbines then the distance X between the C.Geo. 90 and baseline is computed by:

$$F_2 = (0.8)^2(F_1) = 0.64F_1, \text{ and}$$
$$X = \frac{0.64F_1 \times h}{2F_1 + 0.64F_1} = 0.241h,$$

where $F_1$ and $F_2$ are the wind loads on the rear and front turbines respectively, h is the height of the triangle.

The rotation axis 15 is located in the C.G. at distance equal to 0.33 h, eccentricity (ecc) of the applied wind load becomes 0.33 h−0.241 h=0.109 h. Based on the baseline drawn between the two 5 MW rear turbines the baseline is $1.1*(126+100.8)=250$ m and the height of the triangle is 216 m. Eccentricity of the wind load resultant becomes $0.109*216=24$ m. The eccentricity will be further increased if different shapes of tower cross section are used.

For example, front tower diameter: 6 m average, height 90 m, drag coefficient of 0.47; the rear rower DSB section with end radius R=2.75 m and flat middle B=3 m, height 90 m, drag coefficient of 0.295 to 2.7; the transverse wind calculation is:

$$F_x = 2.7 \cdot p(2 \cdot 2.75 + 3)(90) = 2066p\backslash$$
$$F_2 = 0.47 \cdot r \cdot (6)(9) = 254r;$$
$$X = \frac{F_1 \cdot h}{F_1 + 2(F_2)} = \frac{254p}{254p + 2 \cdot 2066p} h = 0.06h$$
$$ecc = 0.33/z - 0.06/z = 0.27a$$

where $F_1$ and $F_2$ are the wind loads on the rear and front tower subject to a uniform wind pressure p respectively, and where h is the height of the triangle. The eccentricity becomes $0.27*216=58$ m. If both choices are selected together, the eccentricity will becomes 0.109 h+0.27 h=0.379 h=82 m, which is large. This eccentricity is the maximum value when the wind blows in the transverse direction to the platform center line. It gradually reduces to zero after the platform is wind facing.

Typhoon Attack. The turbines and the tower should be typhoon resistant. For the floating platform (in case that the water depth is deep), the connection beam 13 should be built underwater at a depth where waves have little effect thereon. If water depth cannot cover the beams 13 to an adequate depth, the connection beams 13 should be located above the water level high enough to clear the wave height; see FIG. 20 for example.

According to Table 1, the mud-line overturning moment for a piled bottom fixed turbine is greater than the example floating platform of multiple turbines, which means the example floating platforms described herein will have a greater survival rate as compared to the single piled bottom fixed turbine. The example platforms described herein use a one point mooring system. All the rotor blades rotate to the horizontal direction with the least wind loading area in the blades, to face the wind. The rotors go into a park position. The platform floats on the sea and rotates unrestrained. The unrestrained boundary conditions enable the platform to take on less wind loads.

Construction Procedures. Although there are a number of possible construction methods, and knowing that it is possible for skillful persons of the art to conjure other construction methods, the method presented hereafter is merely one possible way to construct the platform. In this example, the platform may be divided into several segments that are cast/fabricated in factories, and then be brought to the assembly harbor in a dock. There, the segments are joined together to complete the platform, and it would be even more advantageous to erect the towers and with turbines in proper positions. Ideally, the harbor should be deep enough to accommodate the draft of the floaters, but in a case where the depth is inadequate, auxiliary floaters may be used to provide temporary buoyancy to the floaters.

Initially, the base platform with floaters 11, 11/101 or 103 and connection beams 13 are constructed. This requires prefabricating the floaters 11, 11/101 or 103 at a factory, and pre-forming a steel truss that comprises the connection beams 13 (truss shape depends on platform type, e.g., star, triangle, tee, etc.), The prefabricated floaters 11, 11/101 or 103 and steel truss are then transported to the dockside. There, in the sea near the dock, a first floater is fixed utilizing temporary measures, and, by using the buoyancy of the floater alone or with an auxiliary pontoon or piling, a section of the floaters 11, 11/101 or 103 is raised for mounting the steel truss of connection beams 13 thereto, above the water surface 1 for a more convenient installation. The truss of connection beams 13 is then lifted for connection to the floaters and central 14 to complete the base foundation platform construction.

Next, a wind turbine 17/18 is installed on each floater 11, 11/101 or 103. The upper part 150 of the rotation axle is prefabricated in the factory and eventually will be attached on site to the central node 14. The partially constructed platform is now ready to be towed to the site for final installation.

On site, the seabed 2 is excavated of the soft material to form the ditch 3, see FIG. 9. A stone/sand regulation layer 6 is placed in the ditch 3. The gravity base 5 is then lowered with built-in grouting ducts to the required level, and a space between the regulation layer 6 and the weight box 501 is pressure grouted with pressure grout 517. When the pressure grout 517 attains its design strength, the weight box 501 is ballasted by any means.

The lower part 503 of the rotation axle is then inserted into the gravity base 5 and grout 517 is added to fill the any gap to fix the lower part 503 in place. The platform, completed with the turbines 17, 18, is then floated, with the center of the lower part 503 of the rotation axle aligned to the center of the impact ring 151 within the hollow core 141 of the central node 14. Next, the top part 150 of the rotation axle is lowered, passing through the impact ring 151 to be connected to the lower part 503 by the bolts 153 in the bolted flange 154.

Next, the submarine power cable 44 may be connected to a stationary terminal, and the corresponding turbine power cable 41 is connected to the rotor terminal of the slip ring 42. The platform is now ready to generate electricity. For the other foundation, e.g., the single pile as the rotation axle or the gravity type with suction buckets, the same principles can be applied and will not be discussed in more detail herein. Any leveling adjustment for the platform can be accomplished by water ballasting among the floaters 11, 11/101 or 103 or section of connection beams 13.

Optional Solar Power Panels. For the connection beams 13 located above the water surface, the top face can be installed with solar power panels 49 that can bring in 0.2-0.4 MW installation capacity. In countries where there is no typhoon and plenty of sunshine, such as Indonesia, Malaysia, and Thailand, the triangle-type floating platform is particularly suitable, with the entire top area available for installation of solar power panels 49. The installed capacity of the solar power plant can be 3.0 MW-4.0 MW, which, in combination with the wind power generation unit, can be at a rating 3 MW+5 MW+5 MW+4 MW=17 MW.

The example self-aligning to wind offshore floating platforms ("units") fit well with many tropical island nations, where importing fossil fuel is too inconvenient and expensive, but where the countries have abundant natural power resources such as wind and solar which are untapped. Based on a family of four, and allowing for a 2 kW power installation, the number of families that a single unit can support is 8,500, or a population of 34,000. With two units deployed in the north and south sides of an island, it is possible for each unit to supplement the other so that power supply is continuous, with only minimum storage requirement.

Benefits and Advantages. The example embodiments offer a number of benefits, including but limited to (1) for the same number of wind turbines in a wind farm, by grouping three turbines in a platform, the acquired sea area can be reduced as well as the mileage of the submarine power cable; (2) a self-aligning to wind floating makes the most efficient extraction of wind energy at all times; (3) offers a rotation axle simple in design and easy to replace; (4) can be installed or retrofitted with solar panels; (5) is not geophysically specific, so can be located anywhere without the need of a prior geological investigation of the seabed; (6) can be floated back to harbor for overhaul, modification, repair, or even transported to a new location; (7) the platform, with an auto wind facing aligning mechanism, needs no yaw mechanic in the turbine or platform, and requires no startup power from the grid to turn to wind facing, hence offers substantial savings in money and maintenance, while eliminating down times; (8) has a mud line overturning moment generated by the three turbines that is less than the moment of a single piled turbine; and (9) a required installation facility can be found in most docks in a harbor, with the platform being completed with wind turbines in place and then being towable to the site.

The present invention, in its various embodiments, configurations, and aspects, includes components, systems and/or apparatuses substantially as depicted and described herein, including various embodiments, sub-combinations, and subsets thereof. Those of skill in the art will understand how to make and use the present invention after understanding the present disclosure. The present invention, in its various embodiments, configurations, and aspects, includes providing devices in the absence of items not depicted and/or described herein or in various embodiments, configurations, or aspects hereof, including in the absence of such items as may have been used in previous devices, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

I claim:

1. A self-aligning to wind floating platform supporting multiple wind turbines (17, 18) for wind power generation, comprising:
    at least three floaters (11, 11/101 or 103) and three connection beams (13), each beam (13) arranged between adjacent floaters (11, 11/101 or 103),
    at least three wind turbines (17, 18) each being supported on a corresponding floater (11, 11/101 or 103), each wind turbine subject to a wind load, and
    a rotation axle (150, 503) fixed to the seabed (2) and adapted to restrain the platform from drifting away while permitting rotation, wherein
    a wind load resultant of the three wind loads on the turbines (17, 18), due to a horizontal wind, does not pass through the center of geometry (C.Geo) and the rotation axle (150, 503) simultaneously,
    a yaw moment is created to turn the platform until the wind load resultant passes through the C.Geo and the rotation axle (150, 503),
    the at least three wind turbines (17, 18) are oriented in a direction facing the wind and are divided into two rows along the wind facing direction, a front row and a back row, the front row being hit by the incoming wind first,
    the front and rear turbine rows (17, 18) have differing respective tower cross sectional shapes (19, 20), and
    by manipulating different wind drag coefficients between the front and rear rows of tower cross sectional shapes (19, 20), the wind load resultant acting at the C.Geo will not fall in the rotation axle (150, 503) which is at or close to the C.G. of the platform, with a yaw moment being created by the wind load resultant acting on the C.Geo to turn the platform, until the wind load resultant passes through the C.Geo and the rotation axle (150, 503).

2. The platform of claim 1, further comprising an adjustment structure for adjusting the position of the center of gravity (C.G.), where the rotation axle (150, 503) is at or close to the position of the C.G.

3. The platform of claim 1, wherein
    the front row of turbines (17, 18) has a different power rating than the power rating of the rear row of turbines (17, 18), and
    the C.Geo is not at the same location of the rotation axle (150, 503) which is at or close to the C.G., thus creating an eccentricity between the C.Geo and the rotation axle (150, 503).

4. The platform of claim 1, wherein
    the platform is configured as a triangle-type platform with each of the at least three floaters (11, 11/101 or 103) located at a corresponding vertex of an equilateral triangle,
    each floater (11, 11/101 or 103) supports a wind turbine (17, 18) thereon, and
    the at least three wind turbines (17, 18) are divided into two rows, the front row of turbines (17, 18) having a different rotor size than the rotor size of the rear row of turbines (17, 18).

5. The platform of claim 1, wherein
    the platform is configured as a star-type platform with each floater (11, 11/101 or 103) supporting a corresponding wind turbine (17, 18) thereon, and
    the at least three wind turbines (17, 18) are divided into two rows, the front row of turbines (17, 18) having a different rotor size than the rotor size of the rear row of turbines (17, 18).

6. The platform of claim 1, wherein
    the platform is configured as a triangle-type platform, with each floater (11, 11/101 or 103) located at a vertex of the triangle and supporting a corresponding wind turbine (17, 18) thereon,
    the at least three wind turbines (17, 18) are divided into two rows, the front and rear rows of turbines having the same power ratings, and
    the rotation axle (150, 503) is located in the centerline of symmetry between wind load receiving areas.

7. The platform of claim 1, wherein
    the connection beams (13) are arranged above the water surface (1), with a top surface of one or more of the connection beams (13) having a plurality of solar panels (49) thereon, and
    the platform is provided with a support mechanism (13B) for supporting the solar panel (49) on the connecting beam (13) top surface.

8. The platform of claim 1, wherein the rotation axle (150, 503) is close to or overlaps the C.G. of the platform and is fixed to the seabed (2) so that the platform cannot drift outside a constraint range.

9. The platform of claim 1, wherein one or more of the at least three wind turbines (17, 18) is devoid of yaw mechanical parts.

10. The platform of claim 1, wherein
    any wind turbine (17, 18) in the front row is arranged such that its wake does not affect the rear row wind turbines (17, 18).

11. The platform of claim 1, wherein each connection beam (13) further includes a central node (14) located centrally on the beam (13), the central node (14) supporting an impact ring (151) therein for allowing the platform to undergo all degrees of movement except a horizontal displacement.

12. The platform of claim 1, wherein
    with the platform in shallow water <30m, the connection beam (13) is arranged above the water level (1) at a height that avoids wave attacks, and
    with the platform in deep water >50m, the bottom of each floater (11, 11/101 or 103) is coupled by a stayed wire (507) to a turret (104) on the seabed (2).

13. The platform of claim 1, wherein one or more of the at least three floaters has:

a non-linear floating body (101) with a cylindrical bottom portion (11) and a rounded trapezoidal upper portion, or a non-linear floating body (103) comprised of an upper wine glass-shape portion and a bottom damping plate (102), the diameter of the damping plate (102) smaller than that of the upper wine glass-shape portion.

14. An offshore wind farm comprising one or more platforms as recited in claim 1.

15. A self-aligning to wind floating platform supporting multiple wind turbines (17, 18) for wind power generation, comprising:

a plurality of turbines (17, 18) each supported on a corresponding floater (11, 11/101 or 103), each oriented in a direction facing the wind, the turbines divided into two rows along the wind facing direction, a front row and a back row, the front row being hit by the incoming wind first, and a rotation axle (150, 503) fixed to the seabed (2) and adapted to restrain the platform from drifting away while permitting rotation, wherein any wind turbine (17, 18) in the front row is arranged such that its wake does not affect the rear row wind turbines (17, 18), the front and rear turbine rows (17, 18) have differing respective tower cross sectional shapes (19, 20), and by manipulating different wind drag coefficients between the front and rear rows of tower cross sectional shapes (19, 20), the wind load resultant acting at the C.Geo will not fall in the rotation axle (150, 503) which is at or close to the C.G. of the platform, with a yaw moment being created by the wind load resultant acting on the C.Geo to turn the platform, until the wind load resultant passes through the C.Geo and the rotation axle (150, 503).

\* \* \* \* \*